(12) United States Patent
Hendrix et al.

(10) Patent No.: US 11,422,094 B2
(45) Date of Patent: Aug. 23, 2022

(54) ANALYSIS OF DATA OBTAINED BY FLUORESCENCE FLUCTUATION MICROSCOPY FROM A PLURALITY OF DYES

(71) Applicants: Universiteit Hasselt, Hasselt (BE); Ludwig-Maximilians-Universität München, Munich (DE)

(72) Inventors: Jelle Hendrix, Holsbeek (BE); Nick Smisdom, Geel (BE); Don Lamb, Munich (DE); Waldemar Schrimpf, Munich (DE)

(73) Assignees: Universiteit Hasselt, Hasselt (BE); Ludwig-Maximilians-Universität München, Munich (DE)

( * ) Notice: Subject to any disclaimer, the term of this patent is extended or adjusted under 35 U.S.C. 154(b) by 0 days.

(21) Appl. No.: 16/960,453

(22) PCT Filed: Jan. 11, 2019

(86) PCT No.: PCT/EP2019/050616
§ 371 (c)(1),
(2) Date: Jul. 7, 2020

(87) PCT Pub. No.: WO2019/138028
PCT Pub. Date: Jul. 18, 2019

(65) Prior Publication Data
US 2020/0348234 A1 Nov. 5, 2020

(30) Foreign Application Priority Data
Jan. 11, 2018 (EP) ..................................... 18151211

(51) Int. Cl.
*G01N 21/64* (2006.01)

(52) U.S. Cl.
CPC ..... *G01N 21/6458* (2013.01); *G01N 21/6428* (2013.01); *G01N 2021/6441* (2013.01); *G01N 2021/6471* (2013.01)

(58) Field of Classification Search
CPC ........... G01N 21/6458; G01N 21/6428; G01N 2021/6441; G01N 2021/6471
See application file for complete search history.

(56) References Cited

U.S. PATENT DOCUMENTS 6,142,629 A * 11/2000 Adel .......................... G01J 3/10
351/206
6,819,411 B1 * 11/2004 Sharpe ................... G01N 21/49
356/72

(Continued)

OTHER PUBLICATIONS

International Search Report and Written Opinion dated May 23, 2019, in reference to co-pending European Patent Application No. PCT/Ep2019/050616 filed Jan. 11, 2019.

(Continued)

*Primary Examiner* — David P Porta
*Assistant Examiner* — Djura Malevic
(74) *Attorney, Agent, or Firm* — Dinsmore & Shohl, LLP

(57) ABSTRACT

The analysis of data from fluorescence microscopy is disclosed, more especially fluorescence fluctuation microscopy, being a correlation analysis of fluctuation of the fluorescence intensity enabling quantitative and dynamic information capture. In particular the analysis is described of characteristics such as concentrations, mobility, interactions, stoichiometry, etc. of mixtures of particular that are fluorescently labeled with differently colored fluorophores having different excitation/emission spectra using fluctuation microscopy.

15 Claims, 19 Drawing Sheets

(56) References Cited

U.S. PATENT DOCUMENTS

| | | | | |
|---|---|---|---|---|
| 8,097,865 | B2* | 1/2012 | Westphal | G02B 27/1006 |
| | | | | 250/484.4 |
| 8,280,134 | B2* | 10/2012 | Hoyt | G06K 9/00147 |
| | | | | 382/128 |
| 8,610,088 | B2* | 12/2013 | Westphal | G02B 19/0066 |
| | | | | 250/484.4 |
| 8,803,106 | B2* | 8/2014 | Yamaguchi | G01N 15/1456 |
| | | | | 250/459.1 |
| 9,239,293 | B2* | 1/2016 | Westphal | F21V 9/08 |
| 10,032,064 | B2* | 7/2018 | Hoyt | G06K 9/00127 |
| 10,107,725 | B2* | 10/2018 | Hoyt | G01N 1/30 |
| 10,634,615 | B2* | 4/2020 | Rizo | G01N 21/276 |
| 10,831,013 | B2* | 11/2020 | Yorav Raphael | G02B 7/38 |
| 2002/0071121 | A1* | 6/2002 | Ortyn | C12Q 2563/179 |
| | | | | 356/419 |
| 2003/0138140 | A1* | 7/2003 | Marcelpoil | G06T 7/0012 |
| | | | | 382/162 |
| 2003/0223248 | A1* | 12/2003 | Cronin | G01J 3/10 |
| | | | | 362/555 |
| 2004/0061914 | A1* | 4/2004 | Miyawaki | G01B 11/24 |
| | | | | 359/1 |
| 2005/0065440 | A1* | 3/2005 | Levenson | G01N 21/6486 |
| | | | | 600/476 |
| 2006/0082762 | A1* | 4/2006 | Leverette | G01J 3/02 |
| | | | | 356/72 |
| 2006/0245631 | A1* | 11/2006 | Levenson | G06K 9/6284 |
| | | | | 382/133 |
| 2007/0098252 | A1* | 5/2007 | Cotman | G06K 9/033 |
| | | | | 382/159 |
| 2007/0231784 | A1* | 10/2007 | Hoyt | G01N 21/23 |
| | | | | 435/4 |
| 2008/0074649 | A1* | 3/2008 | Levenson | G06K 9/6289 |
| | | | | 356/73 |
| 2008/0135490 | A1* | 6/2008 | Li | G01N 33/588 |
| | | | | 210/695 |
| 2008/0272312 | A1* | 11/2008 | Tuschel | G01N 21/6452 |
| | | | | 250/459.1 |
| 2008/0294032 | A1* | 11/2008 | Levenson | B82Y 5/00 |
| | | | | 600/407 |
| 2010/0075373 | A1* | 3/2010 | Hoyt | G06K 9/00147 |
| | | | | 435/40.5 |
| 2011/0182490 | A1* | 7/2011 | Hoyt | G06T 7/11 |
| | | | | 382/128 |
| 2014/0056505 | A1* | 2/2014 | Hoyt | G06T 7/90 |
| | | | | 382/133 |
| 2019/0056297 | A1* | 2/2019 | Hoyt | G01N 1/31 |

OTHER PUBLICATIONS

Elson, et al., "Fluorescence correlation spectroscopy. I. Conceptual basis and theory", Biopolymers, vol. 13, pp. 1-27, 1974.
Madge, et al., "Thermodynamic Fluctuations in a Reacting System-Measurement by Fluorescence Correlation Spectroscopy", Physical Review Letter. vol. 29, No. 11, pp. 705-708, Sep. 11, 1972.
Madge, et al, Fluorescence Correlation Spectroscopy. II. An Experimental Realization, Biopolymers, vol. 13, pp. 29-61, 1974.
Ghaemmaghami, et al., "Global analysis of protein expression in yeast", Nature, vol. 425, pp. 737-741, Oct. 16, 2003.
Slaughter, et al., "Toward Quantitative (In Vivo Biochemistry) with Flurorescence Fluctuation Spectroscopy", MBoC Technical Perspective, Molecular Biology of the Cell, vol. 21, pp. 4306-4311, Dec. 15, 2010.
Peterson, et al., Quantitation of Membrane Receptor Distributions by Image Correlation Spectroscopy: Concept and Application, Biophysical Journal, vol. 65, pp. 1135-1146, Sep. 1993.
Digman, et al., "Measuring fast Dynamics in Solutions and Cells with a Laser Scanning Microscope", Biophysical Journal, vol. 89, pp. 1317-1327, Aug. 2005.
Digman, et al., Fluctuation Correlation Spectroscopy with a Laser-Scanning Microscope: Exploiting the Hidden Time Structure, Biophysical Journal: Biophysical Letters, vol. 88, pp. L33-L36, 2005.

Hendrix, et al., "Pulsed Interleaved Excitation Fluctuation Imaging", Biophysical Journal, vol. 105, pp. 848-861, Aug. 2013.
Hendrix, et al., "Arbitrary-Region Raster Image Correlation Spectroscopy", Biophysical Journal, Biophysical Society, vol. 111, pp. 1785-1796, Oct. 18, 2016.
Schwille, et al., "Dual-Color Fluorescence Cross-Correlation Spectroscopy for Multicomponent Diffusional Analysis in Solution", Biophysical Journal, vol. 72, pp. 1878-1886, Apr. 1997.
Digman, et al., "Detecting Protein Complexes in Living Cells from Laser Scanning Confocal Image Sequences by the Cross Correlation Raster Image Sequences by the Cross Correlation Raster Image Spectroscopy Method", Biophysical Journal, vol. 96, pp. 707-716, Jan. 2009.
Bacia, et al., "Correcting for Spectral Cross-Talk in Dual-Color Fluorescence Cross-Correlation Spectroscopy", ChemPhysChem. vol. 13, pp. 1221-1231, 2012.
Rigler, et al., "Fluorescence cross-correlation: a new concept for polymerase chain reaction", Journal of Biotechnology, vol. 63, pp. 97-109, 1998.
Muller, et al., "Pulsed Interleaved Excitation", Biophysical Journal, vol. 89, pp. 3508-3522, Nov. 2005.
Kapanidis, et al., "Fluorescence-aided molecule sorting: analysis of structure and interactions by alternating-laser excitation of single molecules", Proc. Natl. Acad. Sci., vol. 101, No. 24, pp. 8936-8941, Jun. 15, 2004.
Takahashi, et al., "Cross-talk-free Fluorescence Cross-Correlation Spectroscopy by the Switching Method", Cell Structure and Function, vol. 33, pp. 143-150, 2008.
Bohmer, et al., "Time-resolved fluorescence correlation spectroscopy", Chemical Physics Letter, vol. 353, pp. 439-445, Feb. 26, 2002.
Becker, et al., "Time-resolved detection and identification of single analyte molecules in microcapillaries by time-correlated single-photon counting (TCSPC)", Review Science Instruments, vol. 70, pp. 1835-1841, 1999.
Benda, et al., "Fluorescence spectral correlation spectroscopy (FSCS) for probes with highly overlapping emission spectra", Optics Express, vol. 22, No. 3, pp. 2973-2988, Jan. 20, 2014.
Koppel, "Statistical accuracy in fluorescence correlation spectroscopy", Physical Review A., vol. 10, No. 6, pp. 1938-1945, Dec. 1974.
Qian, "On the statistics of fluorescence correlation spectroscopy", Biophysical Chemistry, vol. 38, pp. 49-57, 1990.
Saffarian, et al., Statistical Analysis of Fluorescence Correlation Spectroscopy: The Standard Deviation and Bias, Biophysical Journal, vol. 84, pp. 2030-2042, Mar. 2003.
Wohland, et al., "The Standard Deviation in Fluorescence Correlation Spectroscopy", Biophysical Journal, vol. 80, pp. 2987-2999, Jun. 2001.
Hendrix, et al., "Live-cell observation of cytosolic HIV-1 assembly onset reveals RNA-interacting Gag oligomers", J. Cell. Biol., vol. 210, No. 4, pp. 629-649, 2015.
Matsumoto, et al., "Mersenne Twister: a 623-Dimensionally Equidistributed Uniform Pseudo-Random Number Generator", ACM Transactions on Modeling and Computer Simulation, vol. 8, No. 1, pp. 3-30, Jan. 1998.
Fereidouni, et al., "Spectral phasor analysis allows rapid and reliable unmixing of fluorescence microscopy spectral images", Optics Express, vol. 20, No. 12, pp. 12729-12741, Jun. 4, 2012.
Ivanchenko, "Fluorescence Correlation Spectroscopy: Principles and Developments", Supramolecular Structure and Function, Chapter ID 1, pp. 1-30, Feb. 2, 2011.
Longfils, et al., "Single particle raster image analysis of diffusion", Journal of Microscopy, vol. 266, Issue 1, pp. 3-14, 2017.
Lamb, et al., "Sensitivity Enhancement in Fluorescence Correlation Spectroscopy of Multiple Species Using Time-Gated Detection", Biophysical Journal, vol. 79, pp. 1129-1138, Aug. 2000.
Foo, et al., "Factors Affecting the Quantification of Biomolecular Interactions by Fluorescence Cross-Correlation Spectroscopy", Biophysical Journal, vol. 102, pp. 1174-1183, 2012.
Srivastava, et al., "Diffusion of Transferrin Receptor Clusters", Biophysical Chemistry, vol. 75, pp. 201-211, 1998.

(56) References Cited

OTHER PUBLICATIONS

Wiseman, et al., "Spatial mapping of integrin interactions and dynamics during cell migration by image Correlation Microscopy", Journal of Cell Science, vol. 117, pp. 5521-5534, 2004.

Drobizhev, et al., "Absolute Two-Photon Absorption Spectra and Two-Photon Brightness of Orange and Red Fluorescent Proteins", Journal of Physical Chemistry B., vol. 113, pp. 855-859, 2009.

Previte, et al., "Spectrally Resolved Fluorescence Correlation Spectroscopy Based on Global Analysis", Anal. Chem., vol. 80, pp. 3277-3284, 2008.

Niehorster, et al., "Multi-target spectrally resolved fluorescence lifetime imaging microscopy", Nature Methods, vol. 13, No. 3, pp. 257-262, Mar. 2016.

S.Y. Tetin, "Fluorescence Fluctuation Spectroscopy (FFS)", Part A, In: A.M. Pyle, D.W. Christianson (Eds.), Methods in Enzymology, 2013, 518, pp. 1-267.

S.Y. Tetin, "Fluorescence Fluctuation Spectroscopy (FFS)", Part B, In: A.M. Pyle, D.W. Christianson (Eds.), Methods in Enzymology, 2013, 519, pp. 1-302.

\* cited by examiner

ANALYSIS OF DATA OBTAINED BY FLUORESCENCE FLUCTUATION MICROSCOPY FROM A PLURALITY OF DYES

CROSS REFERENCES TO RELATED APPLICATIONS

This application is a national-stage application under 35 U.S.C. § 371 of International Application No. PCT/EP2019/050616, filed Jan. 11, 2019, which International Application claims benefit of priority to European Patent Application No. 18151211.2, filed Jan. 11, 2018.

FIELD OF THE INVENTION

The invention relates to the field of fluorescence microscopy, more especially fluorescence fluctuation microscopy, being a correlation analysis of fluctuation of the fluorescence intensity enabling quantitative and dynamic information capture.

The invention in particular relates to analyzing characteristics (concentrations, mobility, interactions, stoichiometry, . . . ) of mixtures of particles that are fluorescently labeled with differently colored fluorophores (different excitation/emission spectra) using fluctuation microscopy.

BACKGROUND TO THE INVENTION

Use of dual or multicolor fluorescence fluctuation microscopy is known to be very difficult in case of spectral overlap. For 'plain fluorescence microscopy' this issue is mostly resolved by scanning the different colors separately or by spectral detection followed by e.g. linear unmixing. While the first is not compatible with FFS (Fluorescence Fluctuation Spectroscopy) because signals from different fluorophores need to be acquired simultaneously, the second option only works well on high-intensity data, and is inherently incompatible with FFS as it would disrupt the fluctuation signatures present in the data, rendering the latter incompatible with fluctuation spectroscopy analysis.

Use of statistical weighting/filtering of spectrally-resolved point (time-dependent) confocal data and of time-resolved 'TCSPC' (time-correlated single-photon counting) imaging confocal data is known.

In the field of analysis, statistical spectrum weighting/filtering in combination with microscopes with an advanced spectral detector is known.

However, advanced spectral detection/imaging increases data size, and thus computational demand considerably, and currently, most microscopes are still not equipped with full spectral detection, but rather, possess only two or three detectors.

AIM OF THE INVENTION

It is the aim of the invention to provide a solution for those users not having such advanced equipment in their possession.

SUMMARY OF THE INVENTION

Despite the observations in the art, the invention enables, in particular for correlation (spectroscopy) analysis purposes, spectral filtering on data for which spectral filtering is not intended (as further defined below), in particular obtained or obtainable without use of advanced equipment and/or low-intensity data (defined as low enough to not disrupt the fluctuation signatures present in the data), and especially on dyes with significantly overlapping emission spectra, known in the field to be unfit for correlation (spectroscopy) analysis purposes.

To be more precise, since multi-color (at least two colors) data (like fluorescence data) in principle can be defined as spectral data (be it in the two color example with a poor spectral resolution), it is worth to define true spectral data as data with (substantially) more spectral bands (colors) than the amount of species to be distinguished (as obtained with advanced equipment known to be a spectral detector), in contract with other spectral data not satisfying such criteria, and preferably be denoted channel-based data (with broad spectral bands).

Hence, contrary to the art, the invention exploits, in particular for correlation (spectroscopy) analysis purposes, spectral filtering on such channel-based data, more in particular channels purposely selected.

As clear from the above and although not limited thereto, the invention is in particular advantageously, as now spectral filtering can be used on data obtained with (less advanced) microscopes without or (very) limited (two or three) spectral detection (normal classical channel-based (imaging) confocal data), to thereby separate the signals of three or more dyes in a still reasonable up to rather perfect separation.

The invention more in particular relates to selected (artificially created) channels, the lower limit of the number of channels being defined by the number of species or number of fluorophores used, more in particular wavelength ranges for each of these artificially created channels are purposely selected to contain a predetermined percentage of photons from one fluorophore relative to another (for instance to ensure that the majority of photons of the corresponding fluorophore while limiting the contribution from the other two dyes. Based on these artificial channels filter functions are calculated and applied to the (spatial) data extending along at least one dimension (such as images).

Use of the above procedure on true (but in adequate e.g. with respect to insufficient terms of bands) spectral data, hence the selecting of channels and re-organizing true spectral data in accordance therewith is possible and may even be advantageously in terms of amount of data to compute on and/or signal to noise ratio's obtainable.

The invention relates to use of the above technique prior to analysis, more in particular correlation analysis (preferably statistically weighted data (image) correlation), therefore the so-called diffusion coefficients, concentrations, molecular brightness, cross-correlation amplitude, related SNR and possibly other related parameters are to be evaluated, more preferably the crosstalk-free correlation of species analyzed is obtained by choice of the filter sets to optimize spectral separation.

The invention relates to optimally determine the above described selected (artificially created) channels.

The invention relates to optimally determine the above described filter sets.

The invention further relates to optimally determine the entire measurement set-up and test scenario to optimally benefit from the described methods. In particular one or more of the following parameters are set such as molecule brightness, signal ratio between molecules, sampling time resolution, microscope resolution, diffusion rate, spectral signature, spectral overlap.

In summary the invention provides a computer implemented method suitable for improving with a (fluorescence fluctuation) microscope (200) obtained (non- or very limited spectrally filtered, in particular in practice up to three filters) fluorescence data (acquired from different fluorophores simultaneously, more in particular from observing mixtures of particles that are fluorescently labeled with differently colored fluorophores), the method comprising (a) step (100) of loading said data (10), related to a plurality of dyes; (b) (band-pass) filtering (110) said data in a predetermined amount (determined by the amount of fluorophores used per dye) of specially selected (spectrally non-overlapping) (artificially) created channels; (c) applying (120) a spectral filtering on said filtered data to separate the data into signals, each related to said dyes (especially three or more dyes) (to thereby determine the fluctuation signatures present in the data).

Note that generally speaking with artificially created channel is meant that the channels are on purposely selected in contrast with channels obtained via typical general hardware filters mounted on the microscope if any. In an embodiment of the invention such artificially created channel is obtained or calculated via computer implemented methods. In an alternative embodiment a suitable (on purposely selected) extra hardware filter (such as an emission filter) is used. Combinations of these embodiments can be used also.

The invention hence also provides a method suitable for improving (re-arranging) with a microscope or other similar type of means obtained data, comprising of spectral info in general terms, but more specifically channel-based (as defined above) data, obtained for a plurality of pixels (organized in an 1 or 2D array), (suitable) for use in correlation analysis as used in correlation spectroscopy by performing a computer implemented preprocessing.

The invention enables use of spatial data (e.g. a raster image) cross-correlation spectroscopy to quantify the interaction affinities between diffusing molecules by analyzing the fluctuations between two-color confocal spatial data sets (images) even on dyes with overlapping emission spectra and without relying on strongly differences in lifetimes thereof.

The invention demonstrates the (unexpected) capabilities of statistical weighting to discerning different species even when limited amount of (hardware) detectors are available.

BRIEF DESCRIPTION OF THE DRAWINGS

With specific reference now to the figures, it is stressed that the particulars shown are by way of example and for purposes of illustrative discussion of the different embodiments of the present invention only. They are presented in the cause of providing what is believed to be the most useful and readily description of the principles and conceptual aspects of the invention. In this regard no attempt is made to show structural details of the invention in more detail than is necessary for a fundamental understanding of the invention. The description taken with the drawings making apparent to those skilled in the art how the several forms of the invention may be embodied in practice.

DETAILED DESCRIPTION OF THE INVENTION

Figure 1A:
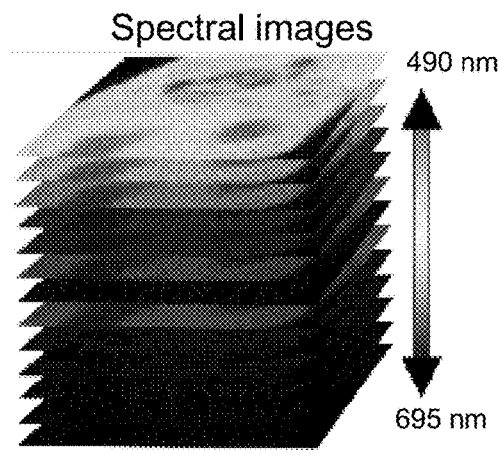
FIGS. 1A-1F. Illustration of raster spectral image correlation spectroscopy (RSICS).

As mentioned before the invention provides a computer implemented method suitable for improving with a microscope obtained fluorescence data, typically 2D-images but not limited thereto. For sake of clarity, while images are typically understood to be n×m (n and m larger than 1) data, the invention is equally applicable to n×1 (n larger than 1) or 1×m (m larger than 1) data as obtained with e.g. time-dependent (spatially static) data or (spatially non-static) line scans. The further used correlation is then adapted accordingly to a 1D correlation. Moreover the (pre-processing) method provided by the invention can be applied with a variety of correlation analysis techniques, hence 2D but also 1D with time, 2D with time and even 3D with time.

Further on more details on a particular spectral analysis technique called RSICS are given.

In essence a data (such as an image) correlation algorithm is provided that allows distinguishing two or more fluorophores as detected on a laser scanning microscope equipped with classical two or more channel-based detection in a robust and sensitive manner.

The method involves statistically weighting the data (images) prior to correlation analysis using pure fluorophore data recorded in a similar manner. The data (image) correlation algorithm is applicable to solution-based and live-cell spatial (raster) imaging data and can be applied to all kinds of live cell, time lapse and in vivo experiments, and can be implemented in all methods involving temporal, spatial or spatiotemporal correlation analysis in general.

Note that in the above the terms species and dyes are used. To be more specific species include dyes (as the intended spectra to work on) but further includes unintended but present spectra in the set-up such as background noise spectra, autofluorescence influences, laser imperfection influences.

RSICS Removes Crosstalk From Channel-Based Data

It is shown further on that spectral filtering can separate the signals of three or more dyes during RICS analysis using a 23-bin spectral detector. However, most microscopes are not equipped with full spectral detection, but rather, possess only two or three detectors, each covering different, larger (20-100 nm) wavelength ranges. Therefore, we tested the minimal number of channels needed to achieve a perfect separation of the signals. To this end, we used the three-fluorophore data recorded in cells and pooled photons from several spectral channels to emulate a lower spectral resolution. Mathematically, at least one channel is needed for each species, resulting for this example in a minimum of three channels for the three fluorophores used.

Therefore, we sorted the 23 bins (FIG. 7B) into three wavelength ranges of 490-525 nm (bins 1-4, eGFP), 525-588 nm (bins 5-11 Gag.Venus), and 588-690 nm (bins 12-23, mCherry). These particular channels were chosen, as they contain the majority of photons of the corresponding fluorophore, while limiting the contribution from the other two dyes. Based on these new channels, new filter functions were calculated and applied to the images prior to correlation. Surprisingly, the resulting correlation functions exhibited a perfect separation of the signals (FIG. 8). The diffusion coefficients for Gag.Venus (3.3±1.5 µm$^2$/s) and the eGFP-mCherry tandem (21.7±6.9 µm$^2$/s) were virtually identical to the values using the full spectral resolution, and a noticeable cross-correlation amplitude was only present between the eGFP and mCherry signals. However, the lower number of channels did reduce the observed SNR. For mCherry, this effect was very small, on average ~10%, mainly due to the low spectral overlap. For the eGFP and Gag.Venus channels, noise increased more strongly by almost a factor of two. Together, these data show that crosstalk-free correlation of three or more species is feasible even without full spectral detection, given that the filter sets are chosen to optimize spectral separation.

More details on RSICS are now provided.

Crosstalk-Free Multicolor RICS Using Statistical Weighting

Raster image cross-correlation spectroscopy (ccRICS) can be used to quantify the interaction affinities between diffusing molecules by analyzing the fluctuations between two-color confocal images. Spectral crosstalk compromises the quantitative analysis of ccRICS experiments, limiting multicolor implementations to dyes with well-separated emission spectra. Here, we remove this restriction by introducing raster spectral image correlation spectroscopy (RSICS), that employs statistical filtering based on spectral information to quantitatively separate signals of fluorophores during spatial correlation analysis.

We investigate the performance of RSICS by testing how different levels of spectral overlap or different relative signal intensities affect the correlation function and analyze the influence of statistical filter quality. We apply RSICS in vitro to resolve dyes with very similar emission spectra, and carry out RSICS in live cells to simultaneously analyze the diffusion of molecules carrying three different fluorescent protein labels (eGFP, Venus and mCherry). Finally, we successfully apply this statistical weighting to data with a single detection channel per fluorophore, highlighting the general applicability of this method to data acquired with any type of multicolor detection.

In conclusion, RSICS enables artifact-free quantitative analysis of concentrations, mobility and interactions of multiple species labeled with different fluorophores. It can be performed on commercial laser scanning microscopes, and the algorithm can be easily extended to other image correlation methods. Thus, RSICS opens the door to quantitative multicolor fluctuation analyses of complex (bio-)molecular systems.

Figure 10:
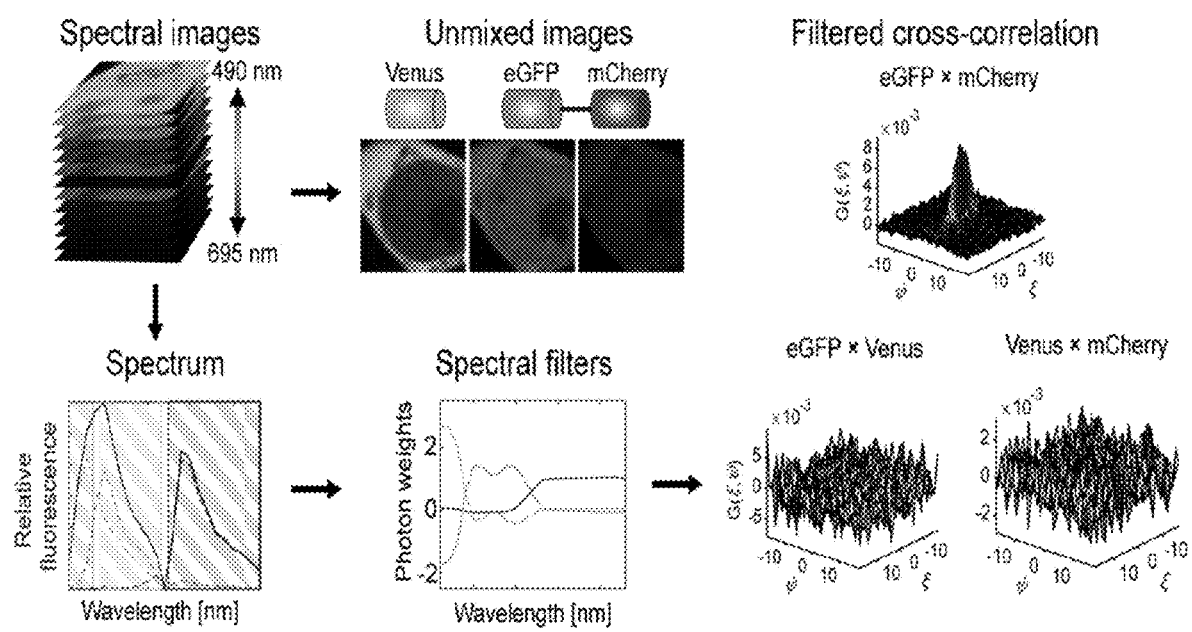
FIG. 10: Overview of the invention
Figure 11A:
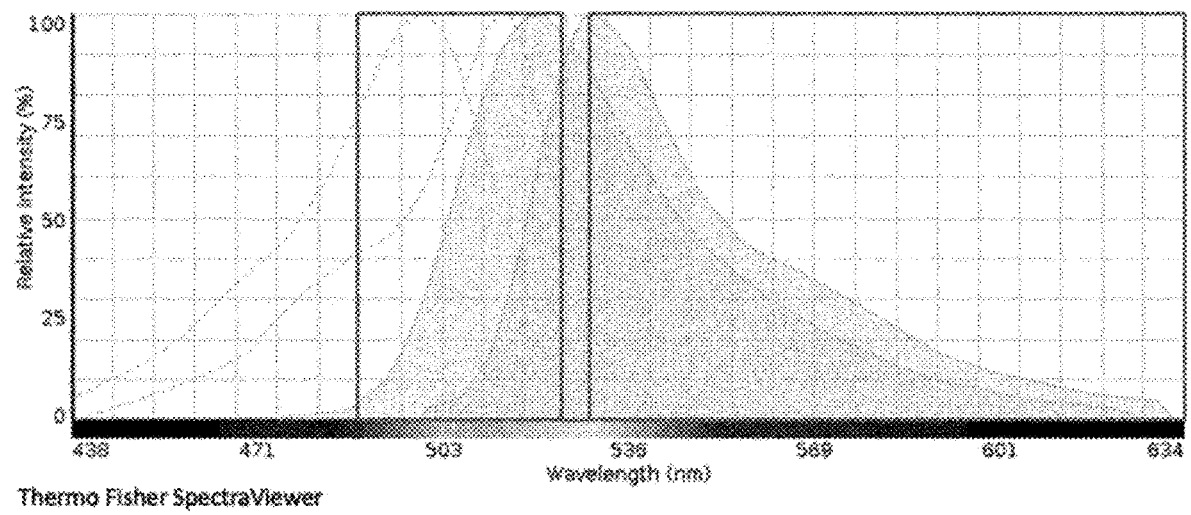
FIGS. 11A-11B: shows an exemplary embodiment of the invention.
Figure 11B:
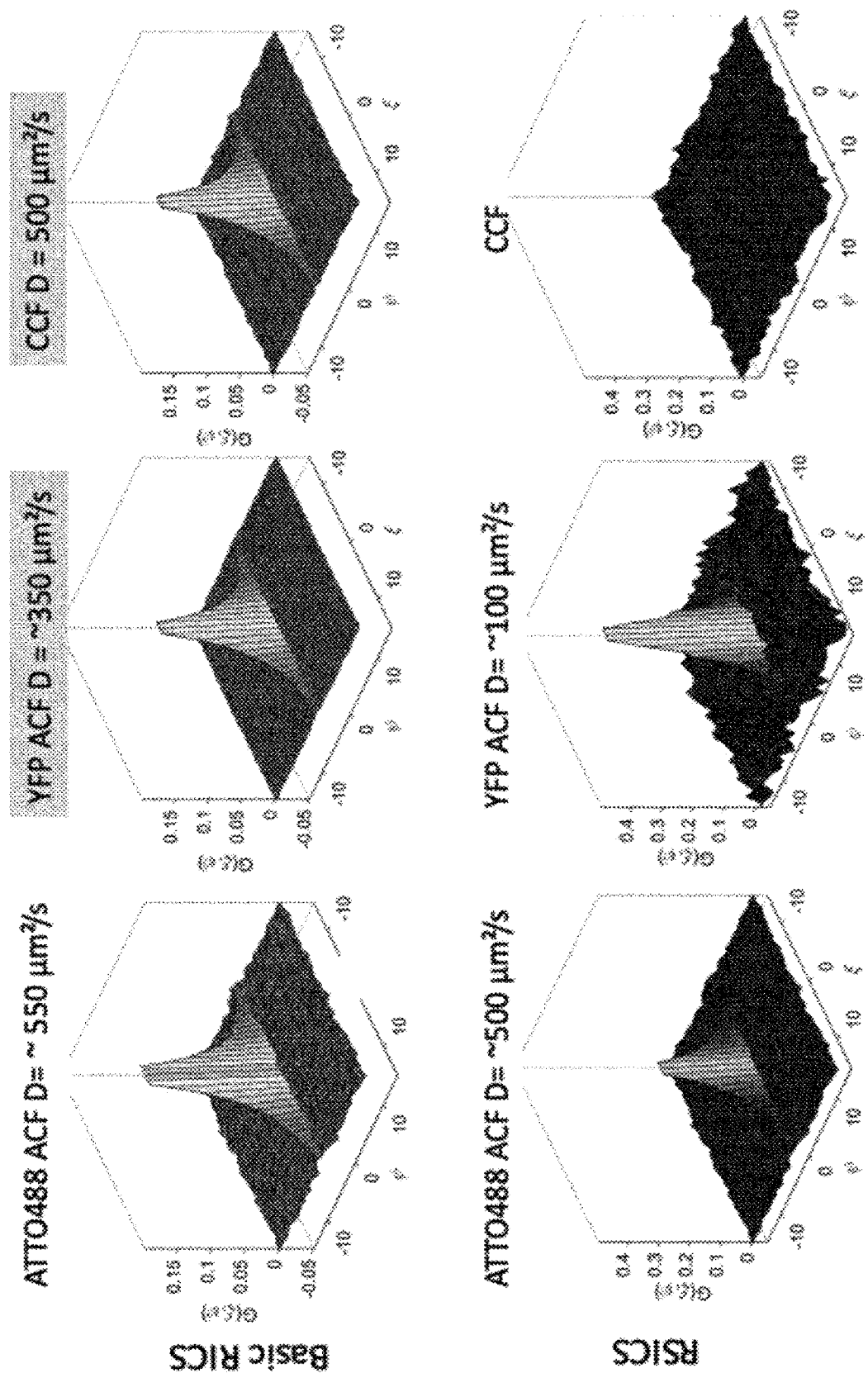
Figure 12A:
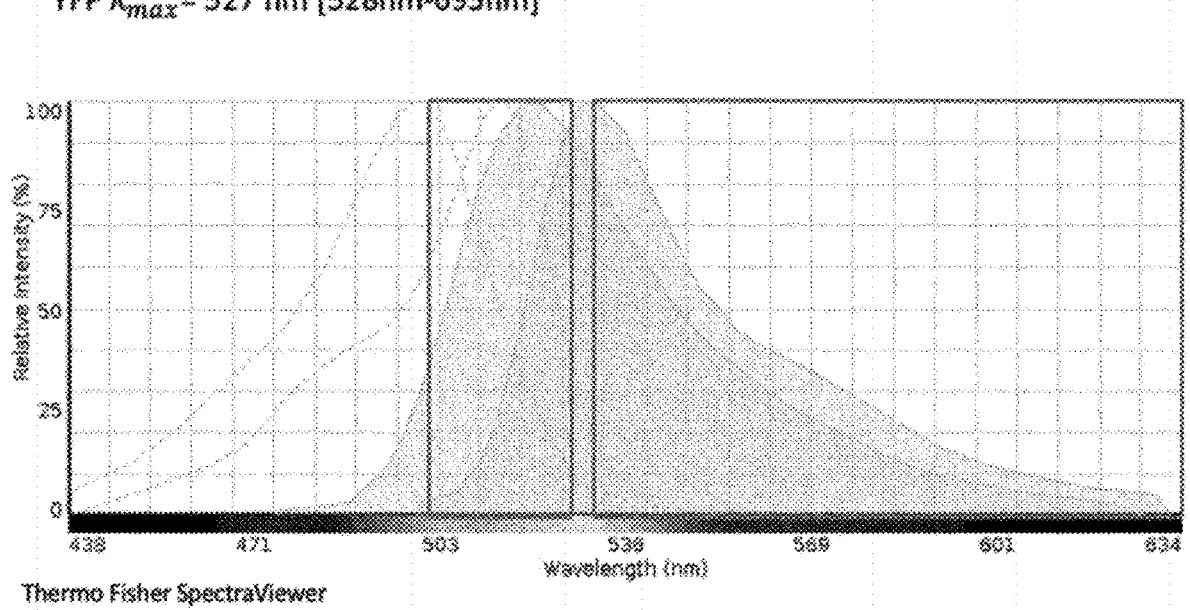
FIGS. 12A-12B: shows another exemplary embodiment of the invention.
Figure 12B:
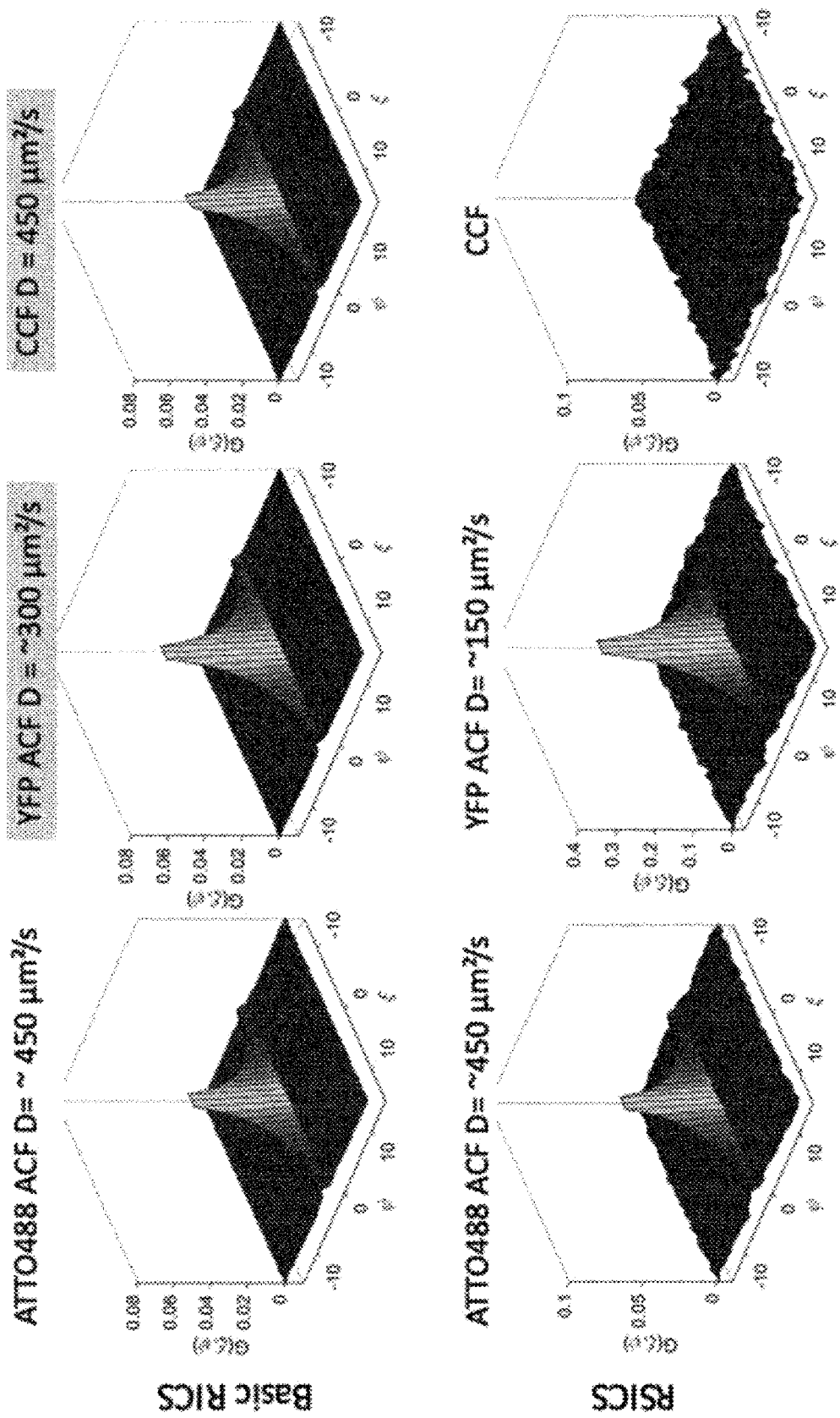

FIG. 10 gives an overview of the invented method, which has one or more of the following features:
  Raster image correlation spectroscopy & statistical spectrum weighting were combined.
  Spectral overlap, brightness and relative intensity influence the signal-to-noise ratio.
  Statistical filters are sensitive to artifacts and need to be carefully recorded.
  Three-color crosstalk-free RIGS can be carried out with little compromise.
  Spectral detection opens the door to multicolor space & time correlation analysis.

1. Introduction

Fluorescence correlation spectroscopy (FCS) is a technique that exploits the information hidden in the fluctuations of the fluorescence signal to extract quantitative properties about the labeled sample [1-3]. Most commonly, the temporal autocorrelation function (ACF) is used to measure diffusion coefficients and concentrations, but FCS can also be employed to investigate a variety of photophysical and molecular processes [4-5]. Typical concentrations for FCS measurements range from 1-200 nM, representative for e.g. physiologically relevant expression levels of most cellular proteins [6-7].

Image correlation spectroscopy (ICS) translates the temporal FCS approach to the spatial dimension [8]. Raster image correlation spectroscopy (RIGS) applies spatial correlation to images recorded on a confocal laser scanning microscope, where the relative time between acquisition of the different pixel is exploited to measure dynamic processes [9-10]. Probing fluctuations over the whole image frame has a number of advantages over measuring fluctuations in a single point. In RIGS, the pixel size is an internal ruler allowing the simultaneous determination of diffusion coefficient and focus size. Additionally, the scanning procedure spreads the excitation over a larger area, increasing the number of observed fluctuations and decreasing photophysical artifacts, such as bleaching and blinking [11]. The recently developed arbitrary-region RIGS (ARICS) even makes it possible to simultaneously quantify dynamics within different subcellular structures [12].

The correlation analysis can be expanded to multiple detection channels by calculating the cross-correlation function (CCF) between different signals. This allows the quantification of co-diffusion and interaction between species labeled with different fluorophores [13-14]. In standard multicolor detection, the channels for the different dyes are generally separated using optical filters. The prerequisite of this approach is a perfect separation of the emitted light of the different species, severely limiting the selection of fluorophore pairs. Furthermore, owing to the shape of the emission spectra of common dyes, there is always some fraction of spectral crosstalk, i.e. a fraction of the light emitted by the shorter wavelength fluorophore into the detection channel of the longer wavelength fluorophore. This results in a non-vanishing cross-correlation amplitude, even in the case of independent diffusion. Correcting for this emission crosstalk a posteriori is possible, but relies on fluorophore photophysical parameters that cannot be verified easily [13, 15-16]. One way to overcome emission crosstalk problems in correlation analysis altogether, is to alternatingly excite the dyes on a time scale faster than the typical correlation time range, using alternating laser excitation (ALEX) or pulsed interleaved excitation (PIE) [17-19]. These techniques work very well for two- or three-color measurements, but are still limited to fluorophores that can be selectively excited. Also, ALEX/PIE requires advanced and usually expensive microscopy hardware that is not commonly commercially available. Another approach to separate the signal of different spectrally overlapping dyes during correlation analysis is to use the fluorescence lifetime information that is available when pulsed lasers and time-correlated single-photon counting (TCSPC) detection are used [11, 20-21]. In fluorescence lifetime correlation spectroscopy (FLCS) and raster lifetime image correlation spectroscopy (RLICS), mathematical filters are used to assign a weight to each photon based on its arrival time relative to the laser pulse and the fluorescence decay of the dye of interest. In principle, lifetime weighting completely cancels the contribution of wrong species from correlation functions. However, the smaller the lifetime difference between species, the longer the measurement time needs to be to achieve a decent signal-to-noise in the filtered correlation function. Moreover, a large variety of good fluorophores with strongly differences in lifetimes does not exist, and application of TCSPC-based confocal microscopy requires the proper expertise. Recently, a new method, fluorescence spectral correlation spectroscopy (FSCS), was introduce that enables multicomponent analysis in single point fluctuation measurements [22]. In FSCS, statistical filters are calculated based on spectral data instead of fluorescence lifetime. The advantage here is that fluorophores typically differ much more in their fluorescence spectra than in their lifetime, considerably increasing the signal-to-noise of the filtered temporal correlation functions as compared to FLCS. This, in turn, reduces the required measurement time or molecular brightness for achieving good signal-to-noise.

Here, we present raster spectral image correlation spectroscopy (RSICS), a method that applies the approach of statistical spectral filtering to spatial correlation (FIG. 1). We analyze the effect of different parameters (molecular brightness, signal ratio, spectral overlap) through simulations and validate the method both in vitro, meaning in solution, and in cells. Concretely, we first use simulated data to explore the applicability of the method in situations with either variable spectral overlap or different relative signal intensities. Next, we apply RSICS to separate two dyes with highly overlapping emission spectra in vitro, and to perform crosstalk-free three-color RICS in cells. Lastly, we show that statistical weighting could even allow discerning three different species using three-color detection based on bandpass filters and dichroic mirrors. As a result, even without any changes to available instrumentation, RSICS proves to be a straightforward, yet powerful approach to perform crosstalk-free multicolor experiments.

2. Theory 2.1 Filter Generation

The first step in performing RSICS is the generation of spectral filter functions $w_i(j)$ for each involved species i (i=1, ..., n) following the same strategy as the established methods of FLCS [20], FSCS [22] and RLICS [11]. The most straightforward way to obtain these filters is to use matrix calculations with the total measured signal $I(j)$ and the spectral patterns of the pure individual species $p_i(j)$, with $j(j=1, ..., m)$ denoting the spectral bin, normalized to unit area:

$$\begin{bmatrix} w_1(1) & \cdots & w_1(m) \\ \vdots & \ddots & \vdots \\ w_n(1) & \cdots & w_n(m) \end{bmatrix} = \qquad (1)$$

$$\left( \begin{bmatrix} p_1(1) & \cdots & p_1(m) \\ \vdots & \ddots & \vdots \\ p_n(1) & \cdots & p_n(m) \end{bmatrix} \cdot \mathcal{D} \cdot \begin{bmatrix} p_1(1) & \cdots & p_1(m) \\ \vdots & \ddots & \vdots \\ p_n(1) & \cdots & p_n(m) \end{bmatrix}^T \right)^{-1} \cdot \begin{bmatrix} p_1(1) & \cdots & p_1(m) \\ \vdots & \ddots & \vdots \\ p_n(1) & \cdots & p_n(m) \end{bmatrix}$$

$$\cdot \mathcal{D}$$

The dot superscript T and superscript-1 represent matrix multiplication, transposition and inversion, respectively. $\mathcal{D}$ is a diagonal matrix of the reciprocal signal intensity for each of the spectral bins j:

$$\mathcal{D} = \begin{bmatrix} \frac{1}{I(1)} & 0 & \cdots & 0 \\ 0 & \frac{1}{I(2)} & \cdots & 0 \\ \vdots & \vdots & \vdots & \vdots \\ 0 & 0 & \cdots & \frac{1}{I(m)} \end{bmatrix} \qquad (2)$$

In case $I(j)=0$, the corresponding element of $\mathcal{D}$ is also set to zero. The spectral filter functions represent intensity weights per spectral bin and, when multiplied with the measured signal $I(j)$, yield the fractional signal intensity $I_i$ of the corresponding species:

$$\Sigma_{j=1}^{m} w_i(j) I(j) = I_i \qquad (3)$$

For spectral imaging, the data are usually present in image stacks where each slice of the stack represents a spectral bin. To get the weighted images, we simply multiply each slice with the corresponding weight and sum over all spectral bins. This is repeated for each temporal frame and for each species. This procedure reduces the spectrally resolved data to separate images (or temporal image stacks) for each involved species, which are subsequently used to calculate image correlation functions by means of the conventional approach as previously described [12]:

$$G(\xi, \psi) = \frac{\langle \delta I_1(x, y) \cdot \delta I_2(x+\xi, y+\psi) \rangle}{\langle I_1 \rangle \cdot \langle I_2 \rangle} \qquad (4)$$

Here, $\xi$ and $\psi$ are the spatial lags (in pixel units), x and y denote the pixel coordinates in the image. The angled brackets represent the average over all valid pixel coordinates of the image. The fluctuation in signal intensity, $\delta I_i$, is calculated according to:

$$\delta I_i(x, y) = I_i(x, y) - \langle I_i \rangle \qquad (5)$$

In the case of autocorrelation, the signal from a single species is correlated with itself (i.e. $I_1 = I_2$). All standard methods for correcting (e.g. moving average subtraction) and correlating (e.g. using Fourier transformations) the images can still be used [8, 11].

2.2 Effect of Filtering on the Signal-To-Noise Ratio

When statistical filtering is performed correctly, it removes the influence of the other species from the amplitude and the shape of the autocorrelation function and any artificial cross-correlation. However, the photons from the other species still affect the correlation functions by introducing additional noise. How much the autocorrelation function is affected in a given case depends on the spectral overlap and the relative signal fraction. For the case of only two species, we can calculate the overlap $p_{ov}$ of the spectral patterns $p_G(j)$ for the green and $p_R(j)$ for the red channels, according to:

$$p_{ov} = 1 - 0.5 \cdot (\Sigma_{j=1}^{m} |p_G(j) - p_R(j)|) \qquad (6)$$

The vertical lines denote that the absolute value should be taken. Note that this definition of overlap results in a single value for both dyes. The relative signal fraction of species i, $f_i$, is given as:

$$f_i = \frac{I_i}{I_{total}} \qquad (7)$$

Here, $I_i$ and $I_{total}$ are the signals coming from species i and the total signal, respectively. From these two parameters, we can estimate the reduction in signal-to-noise ratio (SNR). However, we have to keep in mind that, besides the absolute overlap in wavelengths, also the actual shape of the overlapping spectra influences the quality of the analysis. For this, we consider two extreme cases, which we can use to derive approximations for the reduction in the SNR:

For the first case, most of the photons of a particular dye are in spectral bins that have zero contribution from the other species. These spectral bins will get high weights in the filter $w_i(\lambda)$.

The remaining bins are mostly associated with the other fluorophore and will have weights close to zero. Here, the majority of the correlation signal is constructed from "pure" photons, while the overlap barely contributes. This effectively removes the photons in overlapping bins, similar to using physical filters, so that the SNR of the filtered data ($SNR_{Filtered}$) is just reduced by the amount of overlap when compared to the same experiment in the absence of other species ($SNR_{Pure}$):

$$SNR_{Filtered} = SNR_{Pure} \cdot (1 - p_{ov}) \quad (8)$$

For the second case, all relevant spectral bins have a similar contribution from the other species.

In this case, the additional signal can be thought of as a source of uncorrelated background signal. In fluorescence correlation, noise photons decrease the correlation amplitude by the square of the total intensity [23-26], and we can assume a similar contribution on the filtered correlation:

$$SNR_{Filtered} = SNR_{Pure} \cdot f_i^2 \quad (9)$$

While real experimental data will not perfectly follow these two cases and fall somewhere in between, these equation are useful for estimating the molecular brightness and measurement.

3. Materials and Methods 3.1 Buffers, Dyes and Fluorescent Proteins

For all in vitro experiments, dyes and fluorescent proteins were dissolved in PBS buffer containing 40% (w/w) sucrose (VWR, Leuven, Belgium) in PBS with a viscosity of 6.15 mPa·s at 20° C. [27]. The dye employed in this work is Atto488-COOH (ATTO-TEC GmbH, Siegen, Germany). The eGFP protein was obtained via overnight incubation (37° C., 220 rpm) of Top10f' E. coli cells (Thermo Fisher Scientific, Merelbeke, Belgium) transformed with pBAD: GFP, followed by lysis of the cells and protein purification with a nickel-nitrilotriacetic acid (Ni-NTA) agarose column (Qiagen, Antwerp, Belgium). The buffer was exchanged with PBS and concentration was increased through ultrafiltration with Amicon Ultra 2 mL 3K Centrifugal filters (Merck Millipore, Overijse, Belgium). Prior to eGFP imaging, the 8-well coverslips (Lab-Tek Chambered Cover glass; Thermo Fisher Scientific) were incubated for 30 min with 1 mg/mL BSA (Sigma-Aldrich, Overijse, Belgium) to prevent non-specific adhesion of the eGFP, and washed twice with the measurement buffer.

3.2 Cell Culture and Transfection

HEK 293 cells (passage number 4, kindly provided by Dr. R. Koninckx, Jessa Hospital, Hasselt, Belgium) were cultured at 37° C. in a 5% $CO_2$ humidified atmosphere in complete medium, i.e. DMEM (D6429, Sigma-Aldrich) supplemented with 10% fetal calf serum (cat n. 10270106 Life Technologies Europe B.V., Gent, Belgium). One day prior to transfection, $1.5 \times 10^4$ cells were plated in complete medium in 8-well coverslips (Lab-Tek Chambered Cover glass; Thermo Fisher Scientific). Cells were transfected via calcium phosphate-DNA co-precipitation. Plasmid DNA (100 ng in total) was diluted in HEPES buffered saline solution (HBS, pH 7.1), 250 mM $CaCl_2$ was added and after 15 min of incubation, the mixture was added dropwise to the culture medium. For transfections with peGFP-C1 plasmid (Clontech, Saint-Germain-en-Laye, France), pmCherry (cloned as described in [28]) and peGFP-mCherry (cloned as described in [11]), an empty plasmid vector (pCAG-FALSE, Addgene plasmid #89689) was co-transfected in a 100:1 empty:FP plasmid weight ratio to obtain a protein density compatible with RICS. Co-transfection of fluorescent proteins were performed in a 1:1 plasmid weight ratio. For transfections with the plasmid for Gag.Venus (pKHIV$^{Venus}$, obtained from Barbara Muller, University of Heidelberg and cloned as described previously [28], no empty plasmid vector was needed. At 12-16 h post-transfection, cells were washed and the cell medium was replaced with phenol-free HEPES-buffered DMEM (cat.n. 21063029, Thermo Fisher Scientific).

3.3 Software

In an embodiment of the invention the software package PAM is used.

In another embodiment of the invention software implementation in MATLAB are used.

3.4 Simulations

In the first step, non-spectrally resolved images were created, similarly to the methods described in [12]. For this, random motion of independently diffusing particles was simulated (in 1 µs steps, i.e. 1 MHz sampling time) using a pseudo-random number generator based on the commonly used Mersenne Twister algorithm [29]. Since the investigated properties are the same for diffusion in two and three dimensions, the particle movement was restricted to a 2D, decreasing the space required for the simulation. This, in turn, reduced the number of particles needed for adequate concentrations and thus saved simulation time. The total size of the simulated box was 15×15 pm². Upon exiting the box, the particles were reintroduced on the opposite side. Photon emission was also randomized. For this, a uniform random number between 0 and 1 was created. If this number was lower than the particle's emission probability (based on the particle's brightness and its position relative to the focus), a photon was created. For the detection volume, a 2D Gaussian with a waist $\omega_r$ (at $1/e^2$ of the maximal intensity) equal to 200 nm was used, and the molecular brightness in the center of the focus was set to 100 kHz (i.e. 10% emission probability). To emulate raster scanning, the focus was moved during the simulation. The scanned area was 300× 300 pixels² at a pixel size of 40 nm (image size of 12×12 µm²). The pixel, line and image dwell times were 10 µs, 3 ms and 0.9 s, respectively. Per experimental condition, a total of 10,000 (n≈2.8, see Eq. 10 in part 3.6) or 1,000 (N≈0.28) particles were simulated for 4×50 frames. The movement of the green and red particles was treated absolutely independently, with diffusion coefficients of 1 µm²/s for the green, and 20 µm²/s for the red channel. The molecular brightness was adjusted by randomly discarding a fraction of photons from the original 100 kHz simulations, 95% for 5 kHz, 90% for 10 kHz, 80% for 20 kHz and 50% for 50 kHz. The same molecular brightness was always used for both channels.

To emulate spectrally resolved detection, photons of each simulated image were distributed over 36 spectral bins with a width of 5 nm (500 nm to 680 nm). For this, each photon was assigned to a bin with a probability derived from particular spectrum used. These spectral patterns were based on the emission spectra of the fluorescent proteins eGFP (G), eYFP (Y), mOrange (O), or mCherry (R) (Chroma® spectra-viewer app [30]). These four 4D image series were either used directly as pure-species reference data, or the intensities of the green and red species were summed up per spectral bin to create mixtures of species. Each simulated experiment was repeated 4 times. The uncertainty given in the results section represents the standard deviations between individual experiments.

3.5 Scanning Confocal Imaging

All imaging experiments were performed on a Zeiss LSM880 confocal laser scanning microscope (Carl Zeiss, Jena, Germany) using a Zeiss C-Apochromat 63×/1.2 W Korr objective. Per measurement, 100 frames were acquired at 10 μm above the coverslip (in vitro measurements) or through the center of the transduced cell at room temperature (20-21° C.). The scanned area was 256×256 pixels² at a pixel size of 50 nm (digital zoom 10.5, image size 12.85×12.85 μm²). Pixel, line and image dwell times were 8.19 μs, 4.92 ms and 1.26 s, respectively. Atto488-COOH, eGFP and Gag.Venus were excited with a 488-nm Ar-ion laser (3.6 μW in the sample, S170C microscope slide power sensor, Thorlabs, Munich, Germany). The mCherry fluorophore was excited either with a 543-nm HeNe laser line (6.8 μW in the sample) for the two-color experiments, or with a 594-nm HeNe laser line (6.3 μW in the sample) for the three-color experiments. Depending on the dyes to be detected simultaneously, dichroic mirrors MBS488, MBS488/543 or MBS488/594 were used. Full-spectrum emission light was registered on 23 (GaAsP) channels of the Zeiss 34-channel Quasar detector (32-channel GaAsP array flanked by two photomultiplier tubes) operated in photon counting mode. Each channel covered 8.9 nm of the spectrum, resulting in a total range from 490 nm to 695 nm. As pure-species reference data, imaging was performed on each individual species with the same imaging settings that were used for the mixtures. The uncertainty given in the results section represents standard deviations of at least 5 separate experiments.

For displaying intensity images of the different fluorophores, a spectral phasor approach was used for de-mixing [31]. For this, the spectral phasor of each pixel was calculated. Additionally, the phasor positions of the pure dyes were used to define the vertices of a triangle in the phasor plot. The relative position of the phasor in this triangle was then used to unambiguously calculate the photon fraction for each fluorophore.

3.6 Raster (Spectral) Image Correlation Spectroscopy

For homogeneous simulations and in vitro measurements, the standard image correlation algorithm could be directly applied without any moving average correction of the data [8]. For cell experiments, contributions from spatial heterogeneities were removed by performing a moving average correction prior to image correlation [11]. Unwanted pixels (e.g. the outside of a cell or the cell nucleus) were removed by designating an arbitrary region-of-interest ROI or by local mean intensity thresholding, and the analysis was performed using the ARICS algorithm [12]. For Gag.Venus in particular, fast moving dark or bright spots were discarded using a sub-region intensity-fold thresholding, as described before [12]. For spectrally resolved image correlation, the mathematical photon weighting filters were calculated from the spectral profiles obtained from the pure species (the reader is referred to the Theory section) and subsequently used to weight each photon in the spectral image stack. Finally, all spectral bins, now holding the number of photons multiplied with their corresponding weights, were summed per frame and these images were subsequently fed to the image correlation algorithm. To extract a quantitative diffusion coefficient, D, and average number of molecules in the focus, N, a one component model assuming a 3D Gaussian focus shape was used for fitting the spatial correlation function G [10]:

$$G(\xi, \psi) = \frac{\gamma}{N} \cdot \left(1 + \frac{4D \cdot |\xi\tau_p + \psi\tau_l|}{\omega_r^2}\right)^{-1} \cdot \left(1 + \frac{4D \cdot |\xi\tau_p + \psi\tau_l|}{\omega_z^2}\right)^{-\frac{1}{2}} \cdot \exp\left(-\frac{\delta r^2(\xi^2 + \psi^2)}{\omega_r^2 + 4D \cdot |\xi\tau_p + \psi\tau_l|}\right) \quad (10)$$

For the simulations, a one component model assuming a 2D Gaussian focus shape was used:

$$G(\xi, \psi) = \frac{\gamma}{N} \cdot \left(1 + \frac{4D \cdot |\xi\tau_p + \psi\tau_l|}{\omega_r^2}\right)^{-1} \cdot \exp\left(-\frac{\delta r^2(\xi^2 + \psi^2)}{\omega_r^2 + 4D \cdot |\xi\tau_p + \psi\tau_l|}\right) \quad (11)$$

In both equations, and $\xi$ and $\psi$ denote the spatial lag in pixels along the fast and the slow scanning axis, respectively. The scanning parameters $\tau_p$, $\tau_l$, and $\delta r$ represent the pixel dwell time, the line time (i.e. the time difference between the start of two consecutive lines), and the pixel size, respectively. $\omega_r$ and $\omega_z$ are the lateral and axial focus sizes, respectively, defined as the distance from the focus center to the point where the signal intensity has decreased to $1/e^2$ of the maximum. The shape factor γ is $2^{-3/2}$ for a 3D Gaussian and $2^{-1}$ for a 2D Gaussian [32]. The vertical lines denote that the absolute value should be taken over the absolute time lag [33]. The correlation at zero lag time was omitted from analysis due to the contribution of uncorrelated shot noise. Reported values for D, N or molecular brightness are the average±standard deviation of at least four independent simulations or six experiments. The relative cross-correlation was calculated by dividing the amplitude of the cross-correlation at the center (as extracted from the fit) by the geometric mean of the two corresponding autocorrelation amplitudes at the center. To calculate the signal-to-noise ratio, the correlation amplitude at the center (1/N) was divided by the standard deviation of the baseline at zero correlation amplitude ($\xi$ and $\psi$>30).

Figure 2A:
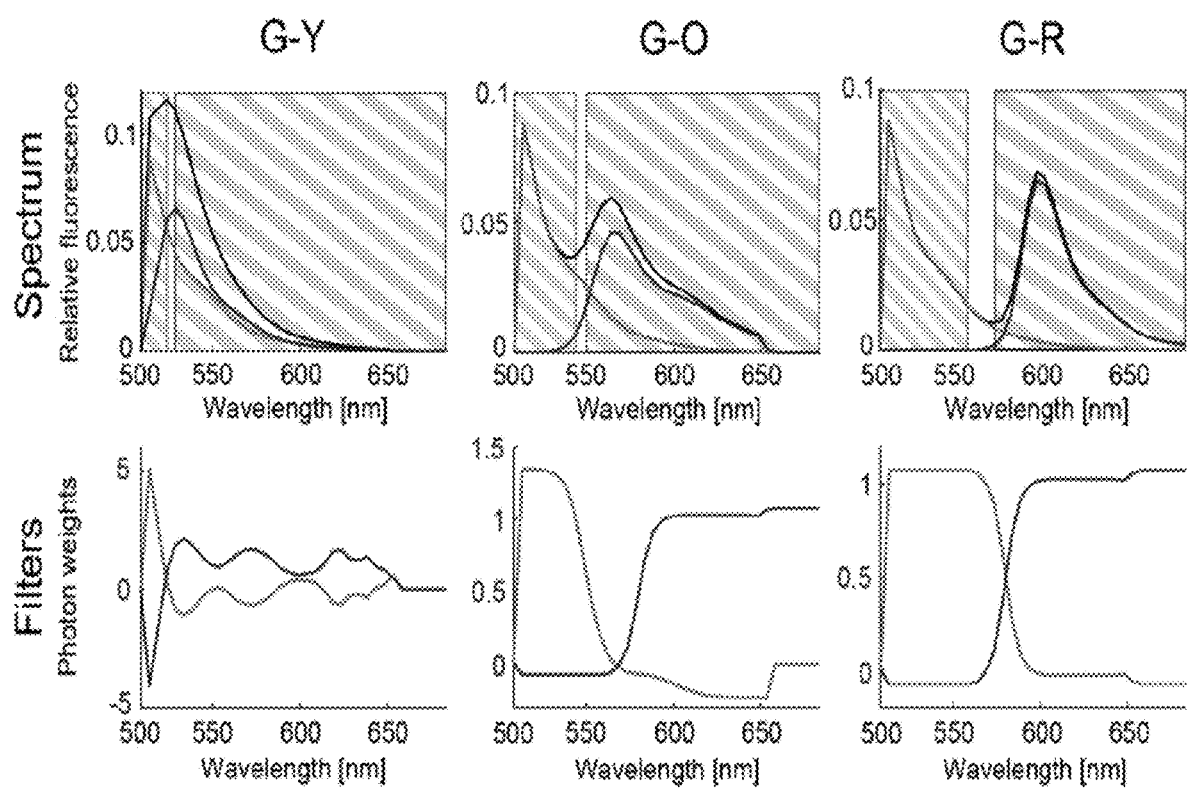
FIGS. 2A-2E. Influence of spectral overlap on filtered image correlation functions in simulated data.

4. Results 4.1 Crosstalk-Free Fluctuation Imaging for Spectrally Similar Fluorophores To test the applicability and the limits of RSICS, we first applied the method to simulated data, where all relevant parameters are known and can be varied independently. A key aspect that affects quality of the filtered data is the spectral overlap between the fluorophores. For this, we simulated independent diffusion of a mixture of a green dye with different red-shifted fluorophores at equal signal ratio between the fluorophores. To best mimic real experiments, we chose an approximation of the eGFP spectrum for the green dye (G). For the red dye, the spectra of eYFP (Y), mOrange (O) or mCherry (R) were approximated, resulting in a spectral overlap $p_{ov}$ of 71%, 24% or 7%, respectively (FIG. 2A). We varied the simulated molecular brightness for each species between 5 kHz (representative for e.g. fluorescent proteins in cells) and 100 kHz (representative for e.g. organic dyes). Additionally, we wanted to compare statistical filtering with separating the signals using physical dichroic and emission filters. In reference to temporal gating [34], we will refer to this as spectral gating. To emulate this, we simply pooled the corresponding spectral bins for the green and the red channels (FIG. 2A, hatched areas).

Based on these data (FIG. 2A), the expected values for the diffusion coefficient and the number of molecules for all dye combinations were recovered for all dye combinations within 5% accuracy, even at very low molecular brightness. Furthermore, the extracted values do not show a systematic deviation, unlike for gated detection, highlighting the effectiveness of the filtering. The precision, on the other hand, was lowered for the G-Y mixture (FIGS. 2C-2D), as is evidenced by the larger error bars compared to the ideal case with 0% overlap (FIG. 2C-2D). For G-O and G-R mixtures (FIGS. 2C-D), this effect was much less pronounced since the overlap here is low. Effectively, the high overlap results in an increased noise level of the filtered correlations, reducing the precision.

Figure 2B:
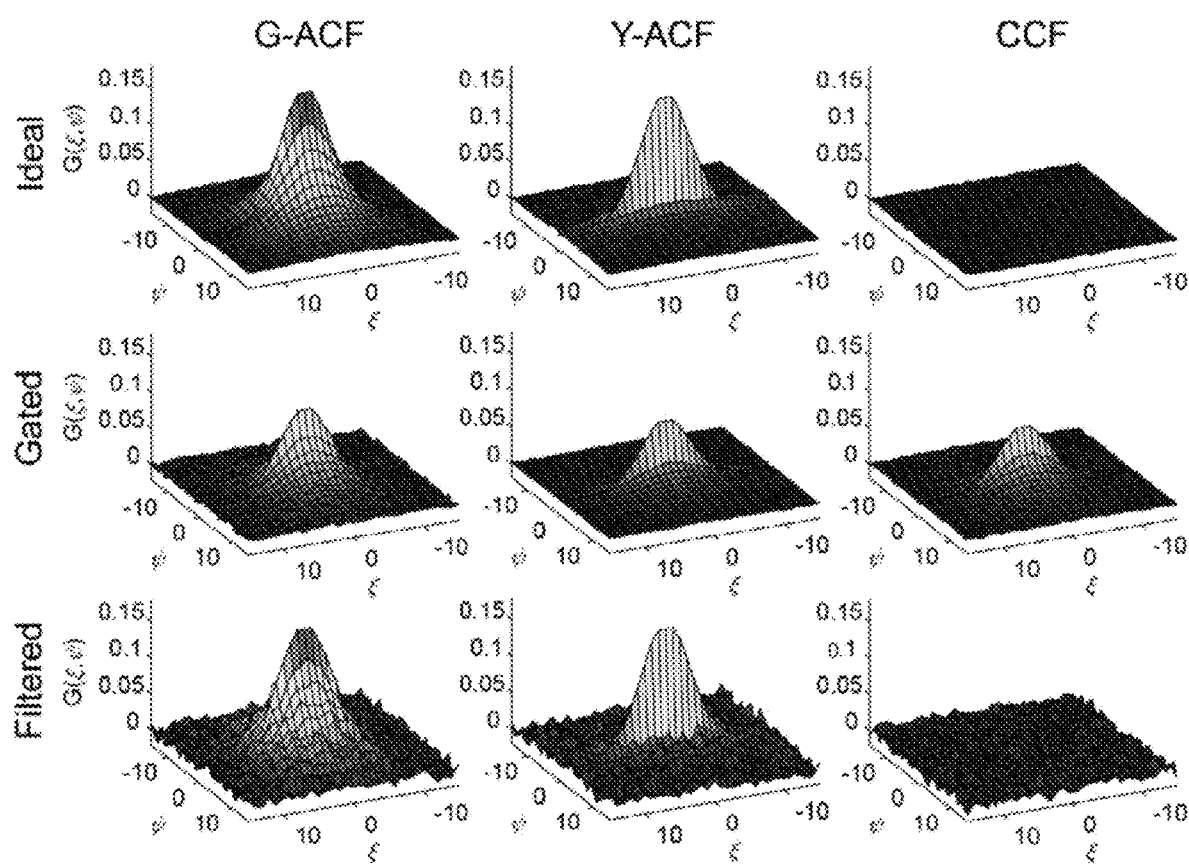
Figure 2C:
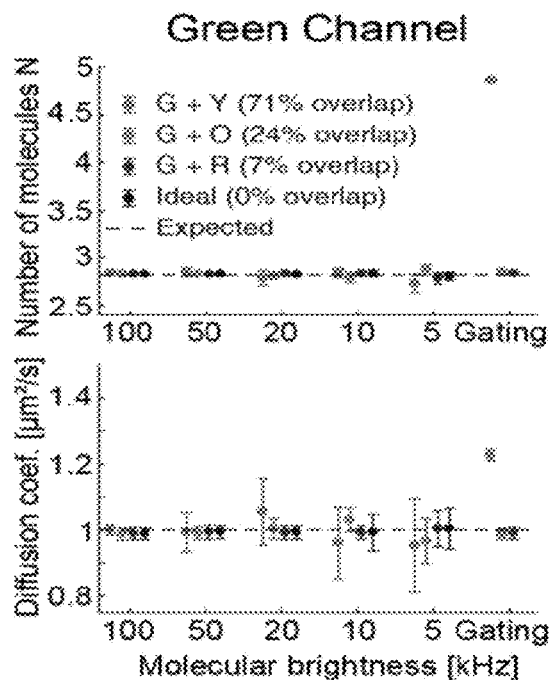
Figure 2D:
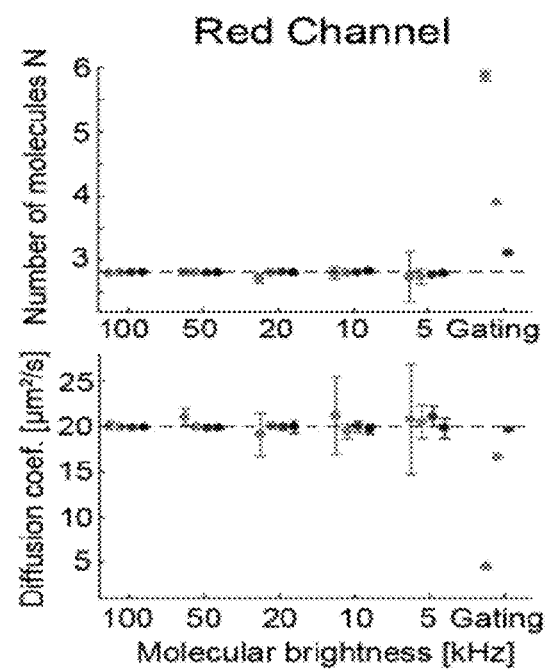
Figure 2E:
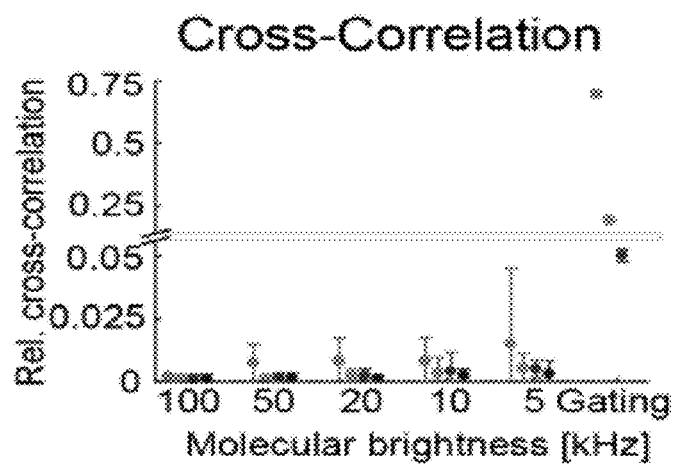

Additionally, the filtering procedure removes any artificial cross-correlations, but correspondingly also increases the noise, making it harder to detect very low cross-correlation amplitudes (FIGS. 2B and 2E).

Because the G-Y simulations suggested that even spectrally similar fluorophores can be discerned using RSICS, we next performed in vitro experiments on mixtures of independently diffusing eGFP and Atto488. This dye combination is an ideal test case as it shows very high spectral overlap (80%, FIG. 3A), allowing us to explore the limits of the method. At the same time, the two dyes have different molecular sizes (28.7 kDa for eGFP and 0.8 kDa for Atto488), and therefore also different diffusion coefficients. This makes it possible to discern systematic deviations (due to a failure of the filtering process) from statistical inaccuracies (due to increased noise). Due to the fast diffusion of these small molecules, it is difficult to accurately determine their diffusion coefficient in aqueous solution with the possible scanning settings of the microscope used for the measurements. Therefore, their mobility was reduced by increasing the viscosity by adding sucrose to the PBS buffer.

In the first step, we tested which molecular brightness (i.e. laser power) was needed to accurately measure diffusion of the two fluorophores at equal contribution. For this, we compared the correlation functions for a molecular brightness of approximately 10 kHz, 20 kHz, and 40 kHz for both dyes. Measurements with a brightness of 10 kHz were too noisy to extract useful information for the given measurement time, while both 20 kHz and 40 kHz data showed adequate signal-to-noise ratios. From these, we chose the settings for 20 kHz for further experiments, unless stated explicitly otherwise, in order to limit photobleaching for measurements with fluorescent proteins in cells.

Without filtering, the measured diffusion coefficient of the mixture was $35.1\pm1.7$ $\mu m^2/s$. With filtering, on the other hand, the diffusion coefficient from the filtered data ($19.9\pm2.3$ $\mu m^2/s$) corresponded very well with what was measured for pure eGFP ($20.9\pm0.9$ $\mu m^2/s$) (FIG. 3). For Atto488, on the other hand, the filtered value ($167\pm116$ $\mu m^2/s$) showed very strong variations and deviated noticeably from the diffusion coefficient of the pure dye ($112\pm12$ $\mu m^2/s$) (FIG. 3). We attribute this deviation to the relatively low SNR of the filtered correlation function. Indeed, as Atto488 exhibits very fast diffusion, the relevant information in the correlation function is concentrated in only a few data-points, rendering the data very sensitive to noise. The data quality could be improved by increasing the molecular brightness (D=$110\pm36$ $\mu m^2/s$ at 40 kHz), or the number of frames (D=$128\pm28$ $\mu m^2/s$ at 300 frames). In all cases, the cross-correlation functions showed no measureable amplitude beyond the noise level (FIG. 3B).

Together, these experiments show that statistical spectral weighting allows the separation of signals from two fluorophores with highly overlapping spectra (>80%) during image correlation analysis. The greatest challenge hereby is the increased noise level, which correlates with the degree of spectral overlap. The higher noise can be counteracted by increasing the molecular brightness, e.g. by using higher laser power, or a longer measurement time, e.g. by recording more frames.

4.2 Relative Signal Fractions Affect the Noise Level of Correlation Functions

In the first part, we investigated the effect of the spectral overlap on the correlation functions at equal signal contribution from both species. However, in actual experiments, the relative concentrations of the different fluorophores can vary strongly, especially when looking at the expression of proteins in cells. To test this influence, we performed additional simulations, this time with a 10:1 excess of either G or Y. As expected, the accuracy of the measured properties for the minor species decreased while it improved for those of the dominant species (FIGS. 4A-4D). For Y, it was impossible to determine the diffusion coefficient at a molecular brightness less than 50 kHz due to the added noise from the excess of G (FIG. 4B). The added noise had much less influence on the measurements for G, but still decreased the precision (FIG. 4C). This high noise level also resulted in small false-positive cross-correlation signals (FIG. 4D).

Figure 5A:
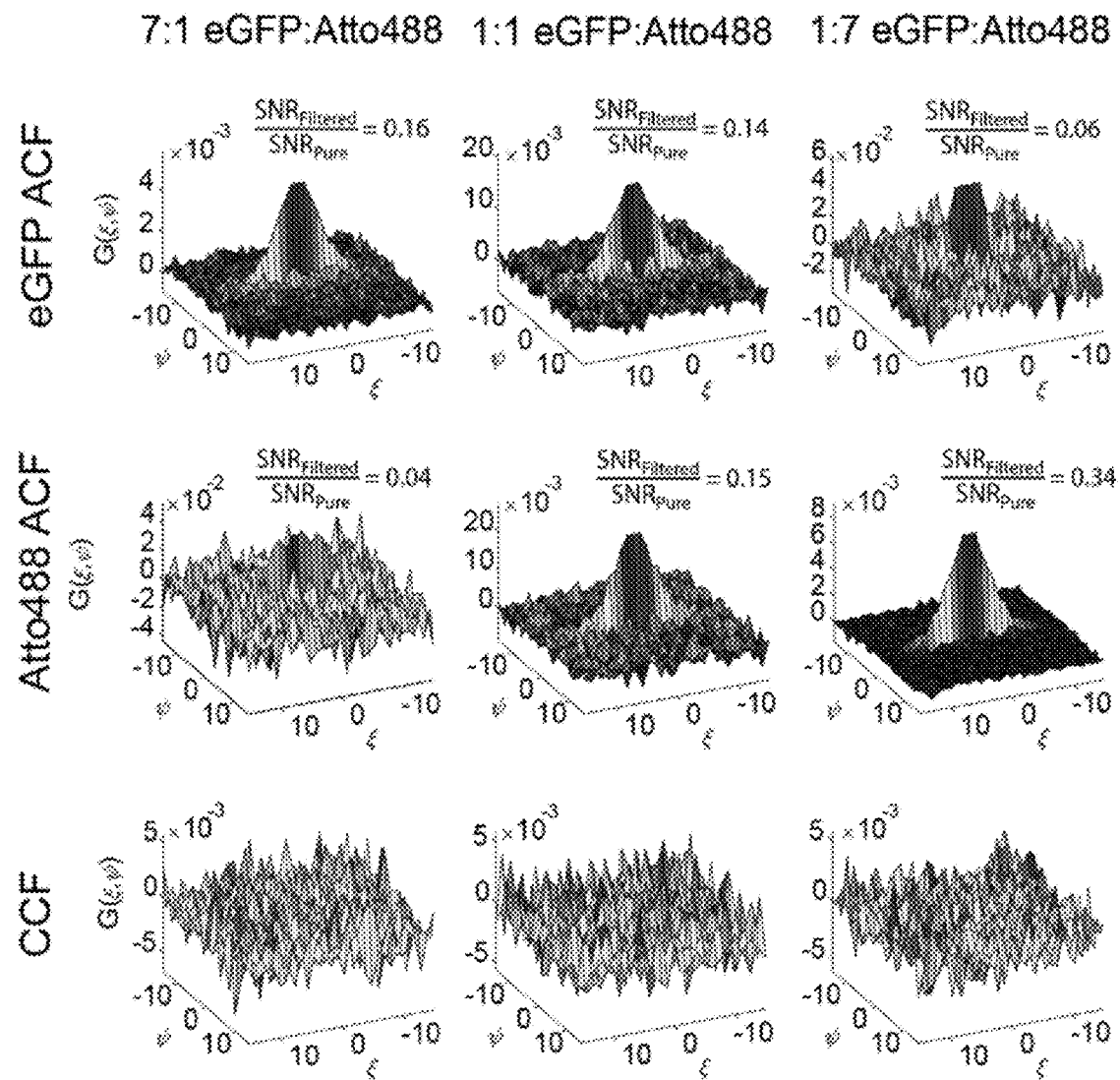
FIGS. 5A-5C. In vitro RSICS experiments with Atto488 and eGFP at different signal ratios.
Figure 5B:
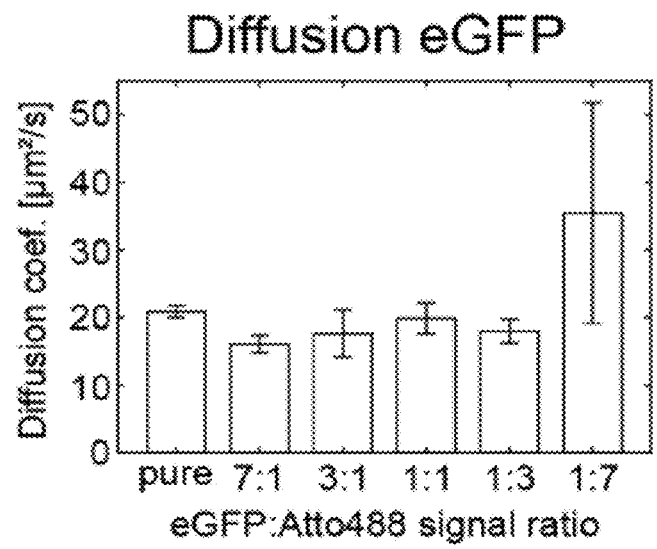
Figure 5C:
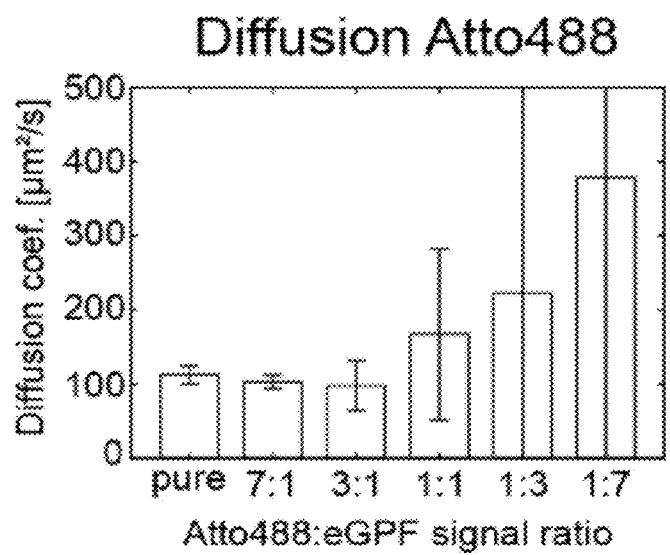

Similar results were also observed for in vitro measurements on mixtures of eGFP and Atto488 at different eGFP: Atto488 signal ratios (3:1 and 7:1 and vice versa, FIGS. 5A-5C). Here, the eGFP diffusion was recovered fairly well, even when it contributed only a quarter of the total signal (FIG. 5B). But, at a eGFP:Atto488 ratio of 1:7, the fit of the eGFP autocorrelation function failed, yielding faster diffusion and stronger variations (FIG. 5B, rightmost bar). On the other hand, fitting of the Atto488 data only worked well if it contributed the majority of the signal (FIG. 5C). Already at a 1:1 ratio, the values became unreliable, and analysis failed completely for lower Atto488 fractions. This decrease in data quality is also reflected in the SNR of the correlation functions (FIG. 5A). For the minor species, contributing $\frac{1}{8}^{th}$ of the total signal, the fold decrease in SNR (Eqs. 8 and 9) was expected to be between 5 and 64, corresponding well to the experimentally observed fold decrease of 17 and 25 for eGFP and Atto488, respectively. For the dominant species, the experimental SNR decreased by a factor of 3-6, similar to the expected factor of 5.

These results show that the relative signal contribution of the individual species critically determines the quality of the filtered correlation data. For the dominant species, the SNR is moderate, while the noise of the minor species can be orders of magnitude higher, requiring higher brightness or longer measurement times to extract accurate values.

4.3 Imprecise Filters Cause Artificial Cross-Correlation

So far, all presented experiments used reference spectra (for calculating statistical filters) that were identical to the actual spectra of the fluorophores in the measured or simulated data. To test the effect of inaccurate filters on the correlation function, we performed additional analyses on simulated and in vitro data.

Figure 6A:
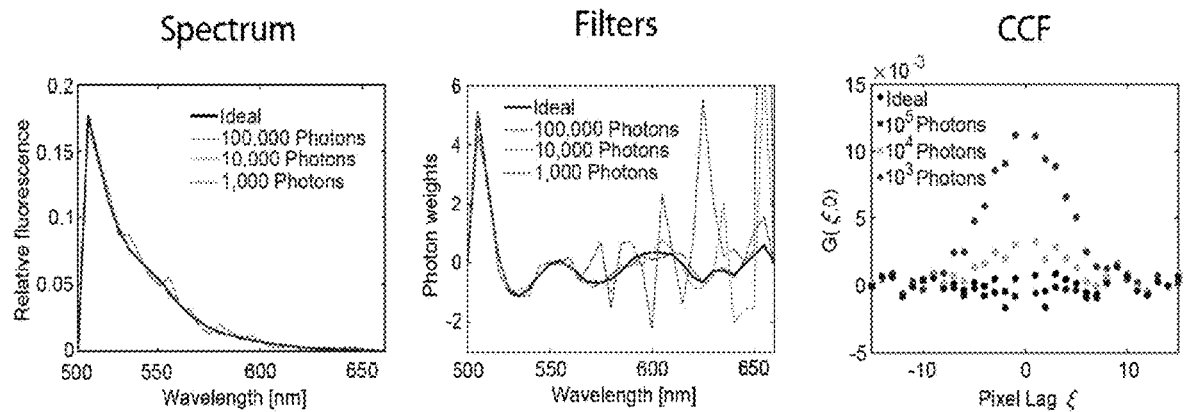
FIGS. 6A-6C. Effect of the filter quality on filtered image correlation functions.

Via simulations, we analyzed to what extent noise in the reference patterns affected the cross-correlation function between independently diffusing G and Y species. For this, the filters were constructed from reference spectra based on $10^3$, $10^4$ or $10^5$ photons (FIG. 6A). When the number of photons was too low, the reference patterns were quite noisy and cross-correlation analysis revealed a small, but measurable artificial cross-correlation amplitude (1-10% of the autocorrelation signal). On the other hand, when $10^5$ or more photons were recorded for the reference, the cross-correlation function was virtually zero, and identical to the case of using a perfectly matching filter set (FIG. 6A). In fluorescence correlation experiments, typically several millions of photons are collected, such that the quality of the reference patterns is usually adequate.

Figure 6B:
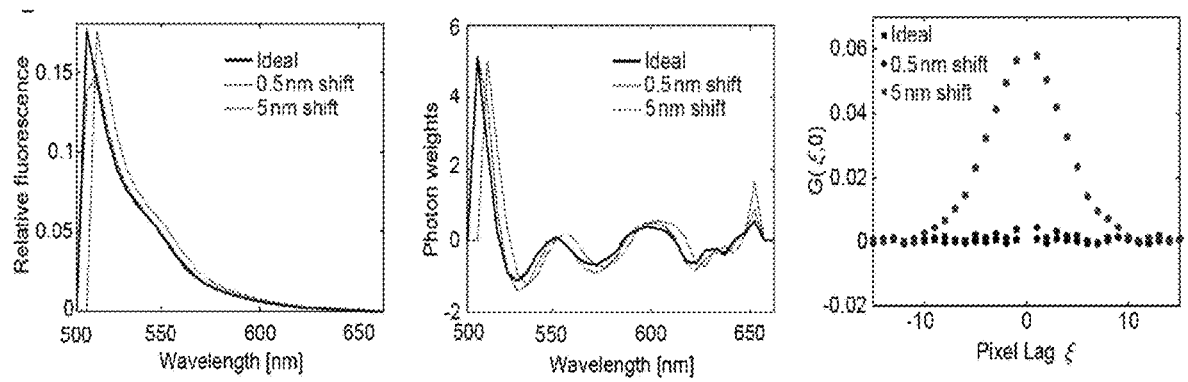

Next, we investigated whether small spectral shifts, e.g. due to small changes in the fluorophores' environment, compromised spectrum filtered RIGS experiments. For this, we analyzed simulations using patterns that were shifted by 1 or 0.1 spectral bins (corresponding to 5 nm or 0.5 nm, respectively) towards longer wavelengths (FIG. 6B). The resulting overlap with the original spectrum was 84% (5 nm shift) and 96% (0.5 nm shift). As we were merely interested in identifying systematic deviations, we used a molecular brightness of 100 kHz and 200 frames per experiment, to increase the SNR of the data. For a shift of 1 bin, the calculations resulted in very strong cross-correlation signals (~50% of ACF), but even for shifts of just 0.1 bins, a systematic false cross-correlation function was still detectable (2-3% of ACF). As expected, the strength of this effect depended strongly on the overlap between the spectra.

Figure 6C:
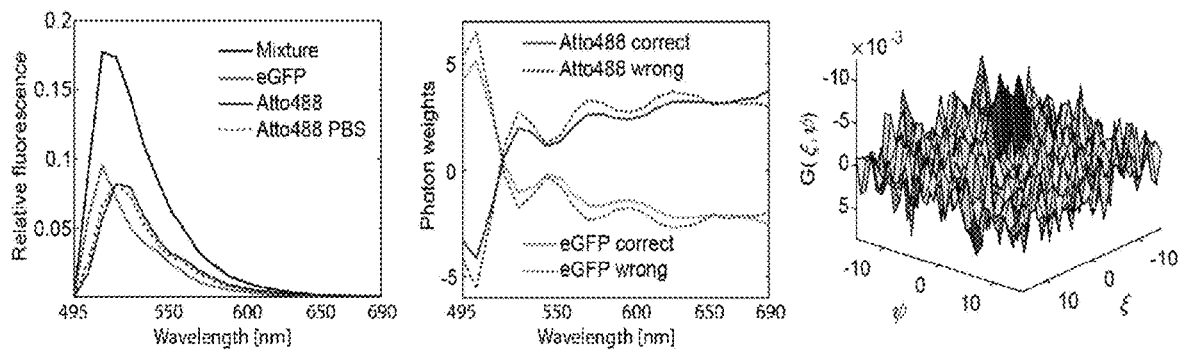

The same effect was also observed in vitro. Measurements of Atto488 in pure PBS buffer and in buffer containing 40% (w/w) sucrose showed a small, but noticeable spectral shift between the two conditions (97% overlap, FIG. 6C). For a 1:1 mixture of eGFP and Atto488, the autocorrelation functions were barely affected when using the wrong filters, resulting in diffusion coefficients for eGFP and Atto488 of $21.0\pm3.6$ $pm^2/s$ and $175\pm113$ $pm^2/s$, respectively, well within expectations. This is understandable, as the majority of signal still originated from the "correct" photons. For the cross-correlation, however, the mismatch resulted in a negative correlation of nearly 30% of the amplitude of the autocorrelation functions (FIG. 6C).

These experiments highlight the importance of recording representative reference patterns. As we showed, especially the cross-correlation function can be strongly affected by using wrong reference patterns, either due to shot noise or due to systematic pattern deviations. It thus seems essential to mimic the experimental conditions as well as possible when recording the reference patterns.

4.4 RSICS Successfully Separates Three Fluorophores in Cells

Up to this point, we have shown that two-species spectrally filtered RIGS is feasible in controlled in silico or in vitro conditions. As a next step, we studied diffusing molecules inside living cells (HEK 293), and expanded the system to three different fluorophores: eGFP, mCherry and the Venus variant of the yellow fluorescent protein. First, we analyzed cells expressing combinations of only two fluorophores: eGFP and mCherry or eGFP and Gag.Venus.

For the first case, we co-transfected HEK 293 cells with a tandem construct of eGFP and mCherry, where we expect a strong cross-correlation signal. As a negative control, we employed cells expressing independently diffusing eGFP and mCherry. In these cells, spectral filtering removed the artificial cross-correlation signal completely, and any remaining amplitude correspond to the noise level of the data (~2% of ACF). Spectral gating, on the other hand, resulted in a residual relative cross-correlation of about 9%. For the tandem construct, a very strong signal was measured with about 50% of the autocorrelation amplitude. While the tandem protein should, in theory, exhibit 100% rel. cross-correlation, in practice, it has been shown that this measured value is reduced by incomplete folding and maturation of the fluorescent proteins, as well as by an imperfect overlap between the two laser foci [35]. Together, this first control experiment showed that spectral filtering can remove artificial cross-correlation amplitude due to spectral overlap, while maintaining the signal from co-diffusing dyes, even when performing measurements in cells.

Figure 7A:
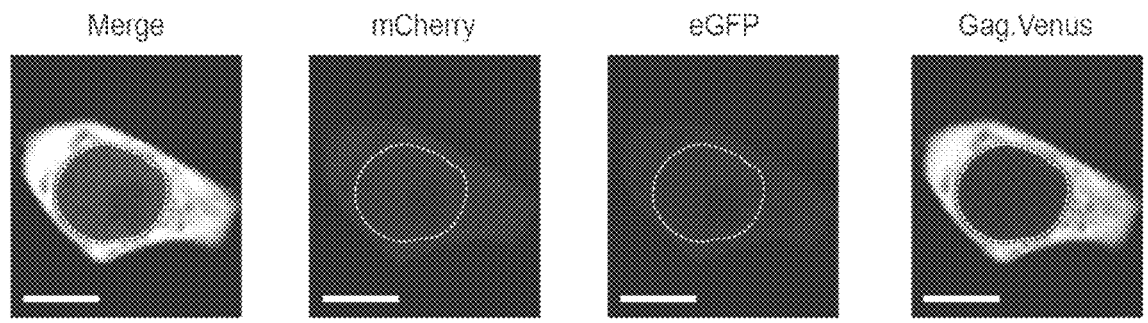
FIGS. 7A-7F. Three-color RSICS experiments in cells.

In the second control experiment, we tested eGFP and Venus, a dye combination with higher (67%) spectral overlap. Venus was part of a human immunodeficiency virus Gag construct (Gag.Venus), a protein known to exhibit very slow diffusion due to interactions with RNA in the cytosol [28]. Unlike the pure fluorescent proteins, Gag.Venus was not present in the nucleus (FIG. 7A). This reduced the number of pixels per frame that could be used for the RSICS analysis, which affected the effective optimal measurement time. Therefore, we increased the number of frames per experiment to 300 while keeping all other settings the same. The diffusion coefficients of pure eGFP ($27.9\pm6.6$ $\mu m^2/s$) and Gag.Venus ($3.3\pm0.9$ $\mu m^2/s$) were recovered very well with RSICS, yielding values of $27.5\pm8.5$ $\mu m^2/s$ for eGFP and $3.7\pm1.2$ $\mu m^2/s$ for Gag.Venus [28]. Again, no crosstalk-induced cross-correlation signal was observed.

Having established that the signals of two fluorophores can be well separated, we performed measurements with all three dyes present in cells at the same time. For this, we co-expressed a tandem construct of eGFP-mCherry and a Gag.Venus construct in HEK 293 cells (FIG. 7A).

Figure 7B:
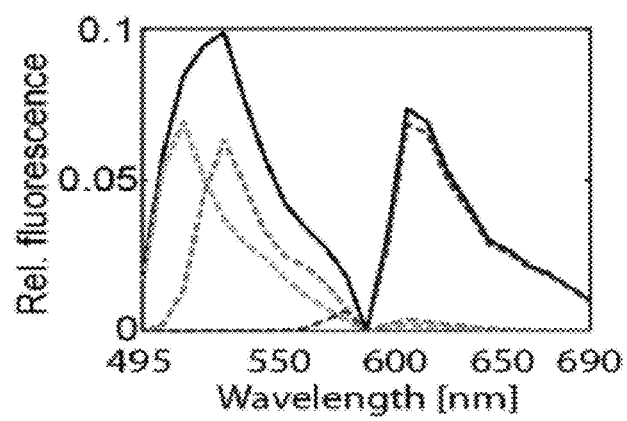
Figure 7B:
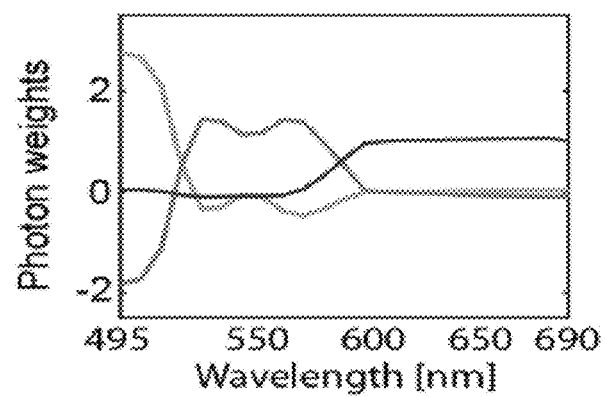

The 594-nm laser line was used to excite mCherry, as it affected the spectrum of Venus less than excitation at 543 nm (FIG. 7B). The filtered analysis again reproduced the expected parameters very well: Gag.Venus diffused very slowly ($3.2\pm1.4$ $\mu m^2/s$, FIGS. 7C and 7E) in comparison with the tandem construct, and independently from the other two dyes, the latter being evidenced by the absence of any cross-correlation (FIGS. 7D and 7F). The high cross-correlation signal between eGFP and mCherry channels, on the other hand, showed that the two dyes diffused together (FIGS. 7D and 7F), with a diffusion coefficient of $21.2\pm5.6$ $\mu m^2/s$ (FIGS. 7C and 7E), based on the cross- and autocorrelation of these channels. Such mobility also corresponds well to the increased size of the tandem compared to the monomeric fluorescent proteins. Since the expression of Gag.Venus and the eGFP-mCherry-tandem were independent, the signal ratios varied between different cells, with the individual fluorophores contributing from 10-90% of the total signal. Even at these extreme values, the diffusion properties could evidently be recovered with adequate accuracy.

5. Discussion

In this work, we introduced spectrally filtered raster image correlation spectroscopy (RSICS). This technique combines the capabilities of FSCS to distinguish the signals of spectrally overlapping fluorophores with the advantages of RIGS in live-cell measurements, such as the reduced bleaching and the information provided by the actual image [9-10, 22]. Using simulated and in vitro experiments, we first showed that RSICS can be used to simultaneously measure the diffusion of fluorophores with almost identical spectra, such as eGFP and Atto488. We further investigated how different properties, such as spectral overlap, the relative signal intensity or the quality of the reference spectra, affect the filtered data. We also demonstrated that the method is applicable to live-cell experiments with three different, spectrally overlapping fluorophores, even if merely a single spectral channel is used per species. While this work only focused on the spatial correlations employed for RIGS, the concepts and principles presented here are equally applicable to the temporal (temporal image correlation spectroscopy, TICS) and the spatio-temporal (spatio-temporal image correlation spectroscopy, STICS) dimensions [36-37].

While the statistical filtering separated the signals from different fluorophores, the presence of the additional species resulted in an increased noise in the data. The main factors affecting the SNR are hereby the spectral overlap and the signal ratio between the different species. For very high overlap, such as in the case of a mixture of eGFP and Atto488 (80%), noise was increased 5-10 times for a 1:1 mixture, and even more strongly if the fluorophore contributed only a fraction of the total signal. For solution measurements, this added noise can be compensated by increasing the laser power or the measurement time to extract accurate diffusion parameters. In e.g. cell experiments, such compensations might not always be possible, rendering RSICS measurements with such extreme overlaps difficult. On the other hand, mixtures with medium (e.g. eGFP and Venus, 67%) or low (e.g. eGFP and mCherry, 9%) spectral overlap were far less affected. Here, the moderate brightness (~20 kHz) and measurement times (~5 min) typically used for cell measurements were ample for quantifying the behavior of three fluorophores at once, even at strongly varying signal ratios (10-90%) and even when just a single spectral channel was used per species. The higher SNR in the channel-based experiments did, however, suggest that the optimal number of channels is determined by the noise introduced by the overall photon weight on the one hand (more channels is better), but also by the noise per individual detector (less channels is better). In all cases, it is paramount to measure the spectrum of the individual species accurately, as even small deviations can result in incorrect cross-correlation amplitudes.

The greatest advantages of RSICS lie in live-cell experiments with fluorescent proteins. The related methods FLCS and RLICS use the fluorescence lifetime to separate the signals [11, 20].

Since fluorescent proteins show only relatively small differences in lifetime, this results in very high overlap in the data and, consequently, in high noise in the correlation functions. Here, RSICS profits from the larger variation in the spectrum of the different fluorophores and the fact that, unlike the fluorescence lifetime, the spectrum is not affected by the presence of Forster resonance energy transfer. Additionally, RSICS also works with a single spectral bin (channel-based detection) for each species, making it possible to do crosstalk free multicolor RIGS on most laser scanning microscopes without the need for changing any hardware. PIE and ALEX, on the other hand, exploit the separation in the excitation spectra as another approach to crosstalk-free correlation functions [17-18]. While PIE/ALEX work exceptionally well for two- or three-color experiments, these methods still require a clear separation in the excitation spectra, which poses a limit on the maximum number of species that can be reliably discerned. This requirement is especially true for two-photon microscopy on fluorescent proteins, where excitation spectra are roughly twice as broad as their single-photon counterpart [38].

Additionally, in PIE/ALEX microscopes, each additional fluorophore requires an additional excitation source and thus a more advanced filter set. RSICS can help to both increase the total number of species studied and reduce the number of used excitation lines. Furthermore, the higher flexibility in the choice of the fluorophores allows the use of dyes with superior performance in regard to photostability, brightness, and maturation or folding behavior.

A different approach to discern multiple species is to utilize the correlation function itself, by employing fit functions with multiple components. For this, methods have been presented that use the spectral information and global fitting to make this procedure more robust [39]. However, to work properly, these approaches need a priori knowledge about many of the photophysical properties of the fluorophores, which is often difficult to acquire. Additionally, these methods often have problems in dealing with artificial cross-correlation and become slow when dealing with many spectral channels ($m^2$ dependence). For normal fluctuation spectroscopy using channel-based detection, correcting for crosstalk a posteriori is also possible, but likewise typically requires detailed a priori knowledge on the fluorophores, and often results in complicated fit models [13, 15-16]. For RSICS, on the other hand, only the spectra of the involved species need to be acquired, which can be easily done in samples labeled with only a single fluorophore.

To conclude, in this work we presented a new crosstalk-free multicolor RIGS method, by applying spectrum-based statistical weighting to raster imaging data. The true future of multicolor fluctuation imaging analysis, however, in our view, lies in truly exploiting the multidimensionality of fluorescence during fluctuation analysis. Recently, Niehörster et al. have shown that simultaneously using the excitation, emission and lifetime properties results in better pattern-matching de-mixing of multi-fluorophore images than when relying on the individual parameters alone [40]. The same is now shown to be true for the statistical filtering applied here, as each added dimension would increase the separation between the different fluorophores, thereby also increasing the signal-to-noise or the number of species that can be accurately measured at once.

The invention can also be further illustrated via the description of the following figures.

Figure 1B:
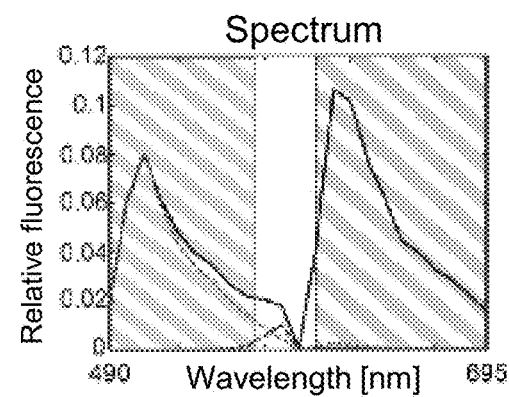
Figure 1C:
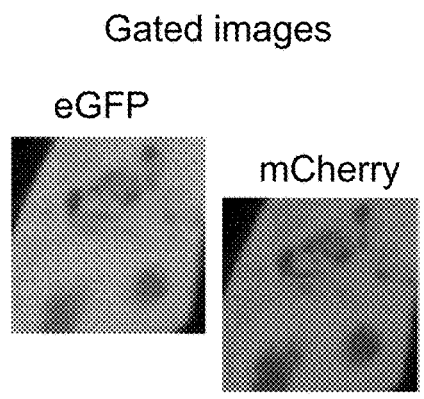
Figure 1D:
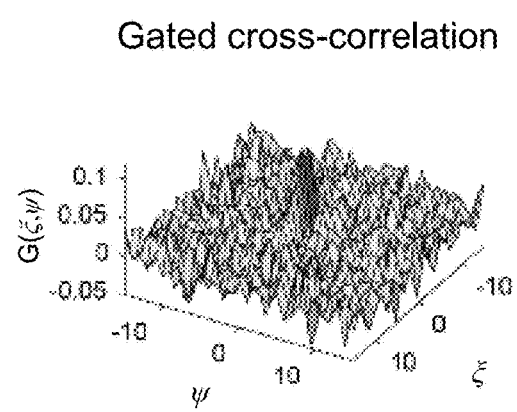
Figure 1E:
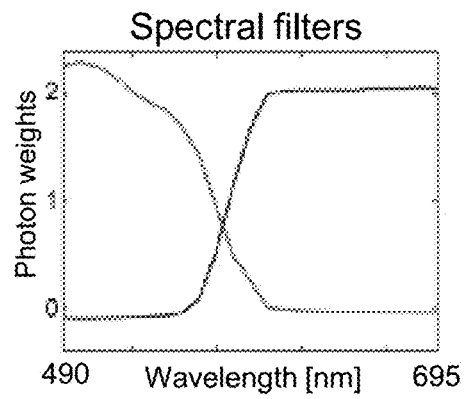
Figure 1F:
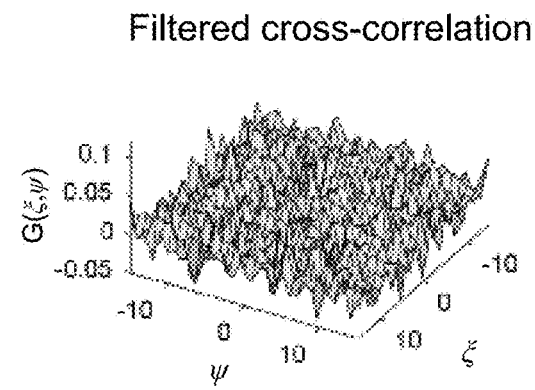

FIGS. 1A-1F. Illustration of Raster Spectral Image Correlation Spectroscopy (RSICS). FIG. 1A) A spectrally resolved image stack is recorded. FIG. 1B) Spectra of two overlapping dyes, here eGFP and mCherry, and of a mixture. For gated analysis, spectral ranges (hatched areas in FIG. 1B for eGFP and mCherry are pooled (FIG. 1C) and correlated (FIG. 1D), resulting in a small artificial cross-correlation amplitude. For spectral filtering, photon weights are calculated (FIG. 1E) and applied to the stack before calculating the correlation function (FIG. 1F), removing any artificial cross-correlation amplitude. Excitation wavelengths were 488 nm and 594 nm.

FIGS. 2A-2E. Influence of Spectral Overlap on Filtered Image Correlation Functions in Simulated Data. FIG. 2A) Spectra (top row) and calculated filters (bottom row) for mixtures of the G (approximating eGFP) species, and Y (eYFP) (left), O (mOrange) (center) or R (mCherry) (right) species. The black line in the spectra is the total signal of a 1:1 mixture. The green and red hatched areas show the spectral bins used for the gated calculations. FIG. 2B) Autocorrelation functions for the G-channel (left column) and the Y-channel (center column) and the cross-correlation function of these two channels (right column) at a molecular brightness of 10 kHz. The top row shows the data for the ideal case with 0% overlap.

The middle and bottom row show the data for gated and filtered analyses with 71% overlap, respectively. FIG. 2C) Number of molecules in the focal volume (top) and diffusion coefficient (bottom) extracted for the green channel. FIG. 2D) Number of molecules in the focal volume (top) and diffusion coefficient (bottom) extracted for the red channel.

FIG. 2E) Relative cross-correlation amplitude (the reader is referred to the Materials and Methods section) between the green and red channels.

For the ideal case with 0% overlap (blue), the two species were treated completely independently. For gated detection, a molecular brightness of 100 kHz was used. Each experiment was based on 50 frames with 300×300 pixels. The error bars represent the standard deviation of four separate experiments. The molecular brightness and total signal were equal for both dyes in all experiments.

Figure 3A:
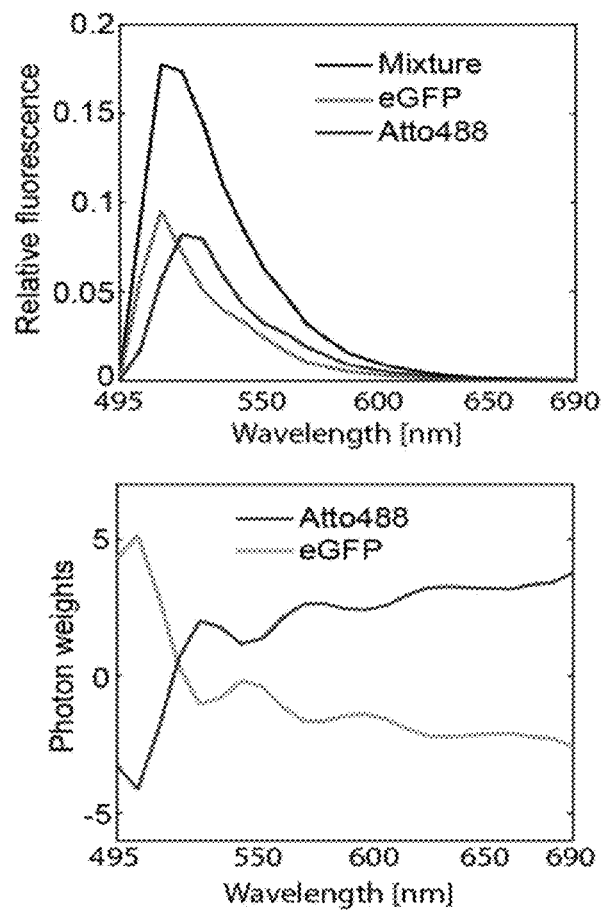
FIGS. 3A-3B. RSICS on mixtures of eGFP and Atto488 in vitro.
Figure 3B:
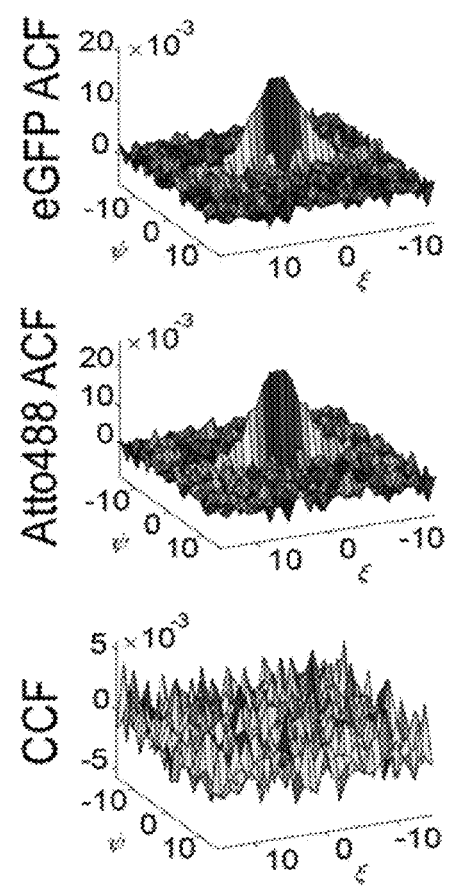

FIGS. 3A-3B. RSICS on mixtures of eGFP and Atto488 in vitro. FIG. 3A) Spectrum (top) and filters (bottom) of eGFP or Atto488 in a buffer containing 40% (w/w) sucrose. The black line illustrates the spectrum of a 1:1 mixture of the two fluorophores. FIG. 3B) Filtered autocorrelation functions for eGFP (top), Atto488 (middle) and the cross-correlation function for a 1:1 mixture of the fluorophores. Excitation wavelength was 488 nm.

Figure 4A:
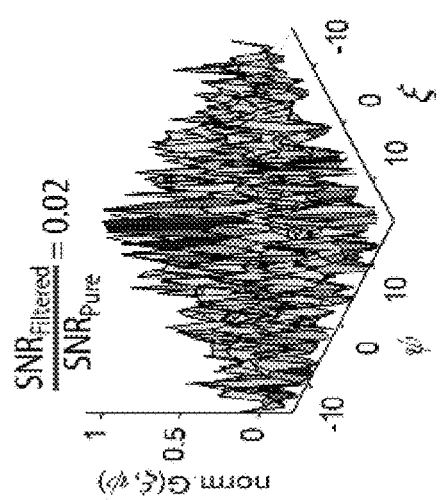
FIGS. 4A-4D. Effect of relative signal intensities on filtered image correlation functions in simulated data.
Figure 4A:
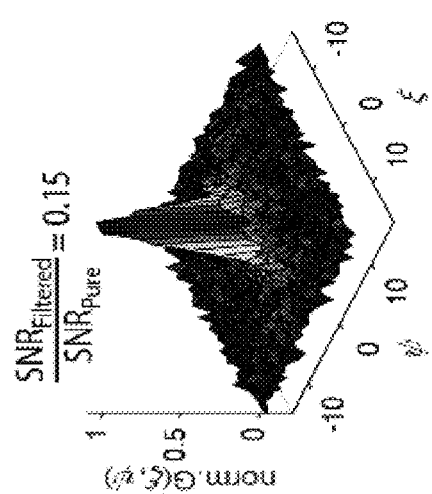
Figure 4A:
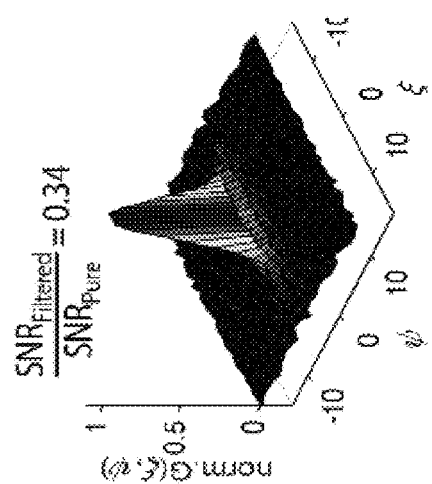
Figure 4B:
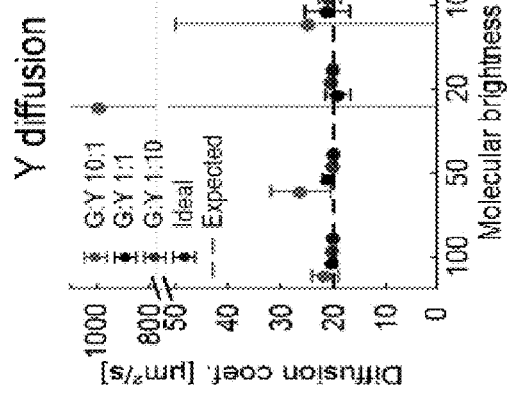
Figure 4C:
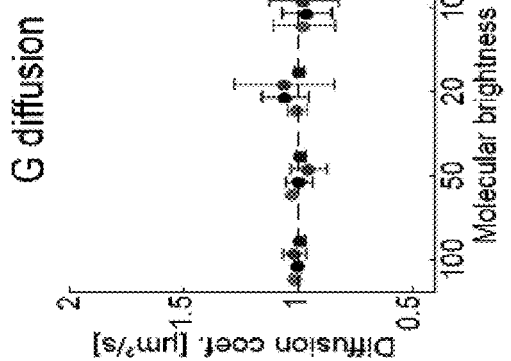
Figure 4D:
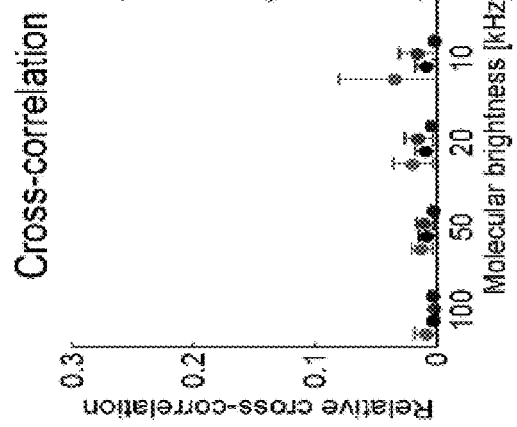

FIGS. 4A-4D. Effect of Relative Signal Intensities on Filtered Image Correlation Functions in Simulated Data. FIG. 4A) Filtered autocorrelation functions of the Y channel from G:Y mixtures of 10:1 (left), 1:1 (center), and 1:10 (right). FIG. 4B) Diffusion coefficients of the Y channel at different G:Y mixtures. FIG. 4C) Diffusion coefficients of the G channel at different G:Y mixtures. FIG. 4D) Relative cross-correlation functions of different G:Y mixtures. Each experiment was based on 50 frames with 300×300 pixels. The error bars represent the standard deviation of four separate experiments. The molecular brightness was equal for both dyes in all experiments.

FIGS. 5A-5C. In vitro RSICS Experiments with Atto488 and eGFP at Different Signal Ratios. FIG. 5A) Filtered autocorrelation functions for eGFP (top row), Atto488 (middle row) and cross-correlation functions (bottom row) for eGFP:Atto488 at fluorescence signal intensity ratios of 7:1 (left column), 1:1 (center column) and 1:7 (right column). These measurements were performed with a molecular brightness of 20 kHz. FIG. 5B) Diffusion coefficients of eGFP for the pure dye and the filtered mixtures at different ratios of eGFP:Atto488. FIG. 5C) Diffusion coefficients of Atto488 for the pure dye and the filtered mixtures at different ratios of Atto488:eGFP. The error bars represent the standard deviation of at least five measurements. Excitation wavelength was 488 nm.

FIGS. 6A-6C. Effect of the Filter Quality on Filtered Image Correlation Functions. FIG. 6A) Spectrum (FIG. 6A left) and filters (FIG. 6A center) for the G channel, as well as an on-axis slice of the resulting cross-correlation functions of a simulated G-Y mixture, based on reference patterns (for G and Y) with 1,000 (red), 10,000 (green) and 100,000 (blue) photons, or the ideal spectrum used for the simulations (black). FIG. 6B) Spectrum (FIG. 6B left) and filters (FIG. 6B center) of the G channel, as well as an on-axis slice of the resulting cross-correlation of a simulated G-Y mixture based on the ideal reference pattern (black), or spectra (for both G and Y) shifted by 0.5 nm (0.1 bins, blue) or 5 nm (1 bin, red). All simulations were 200 frames with 300×300 pixels and a molecular brightness of 100 kHz for both dyes. FIG. 6C) Left: Spectrum of eGFP, Atto488 and the mixture (black line) measured in PBS buffer containing 40% (w/w) sucrose. The blue dotted line shows the slightly shifted spectrum of Atto488 measured in pure PBS buffer. FIG. 6C Center: Exemplary photon weighting filters for eGFP and Atto488. The light, solid lines represent filters calculated using the correct spectral patterns. The darker, dotted lines were calculated using the shifted Atto488 pattern measured in pure PBS buffer. FIG. 6C Right: Cross-correlation function between filtered eGFP and Atto488 channels using the wrong spectral patterns. As the cross-correlation function has a negative amplitude, the z-axis was inverted.

Figure 7C:
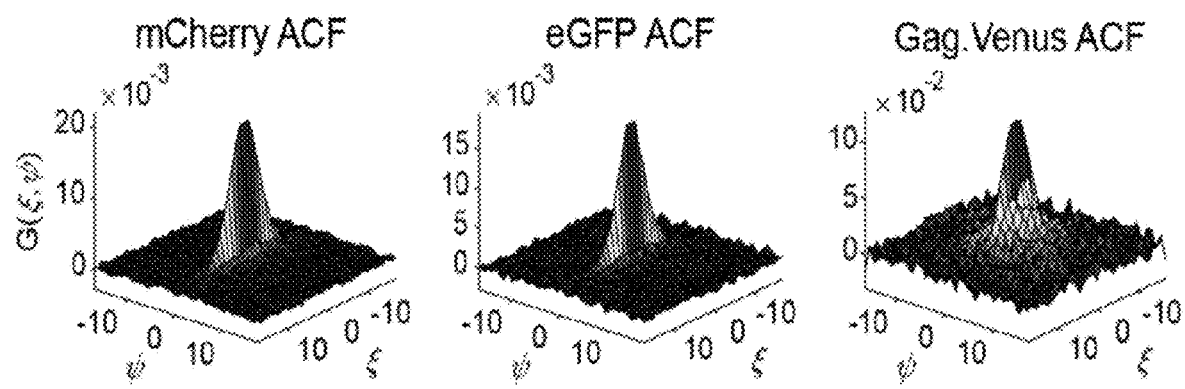
Figure 7D:
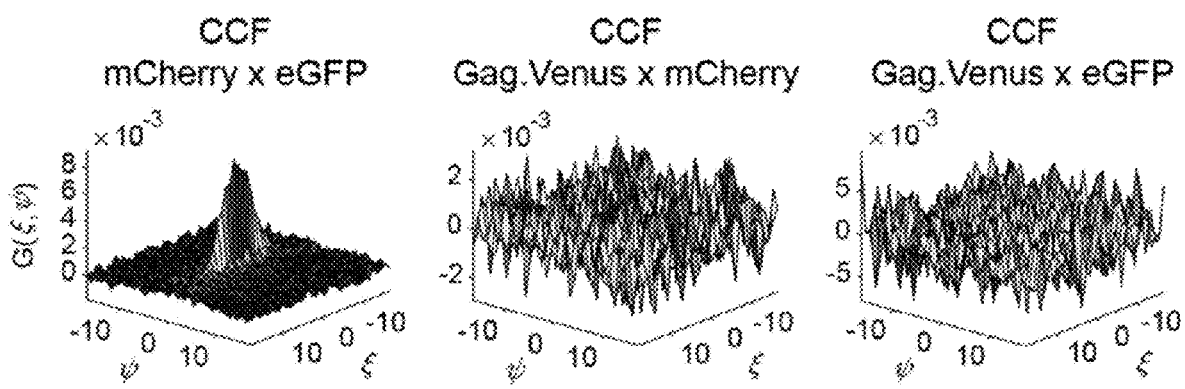
Figure 7E:
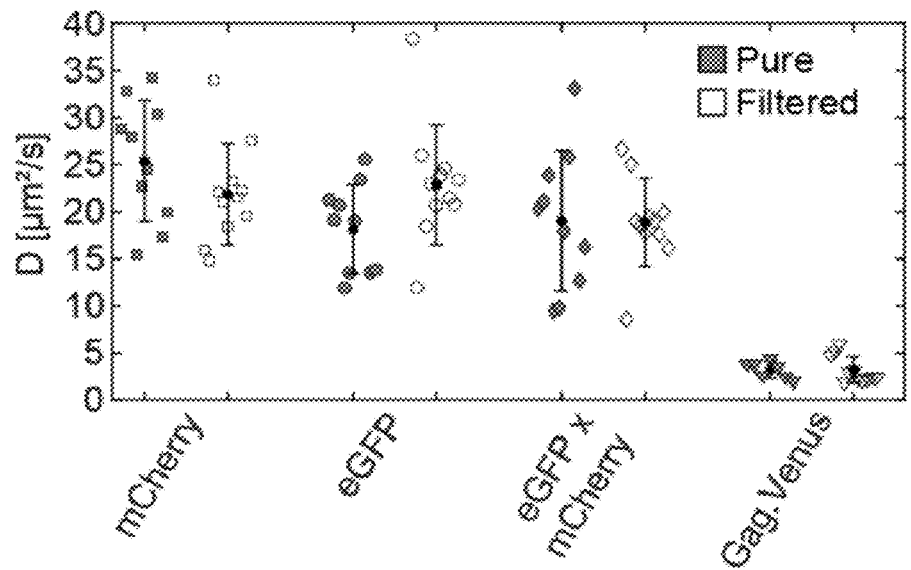
Figure 7F:
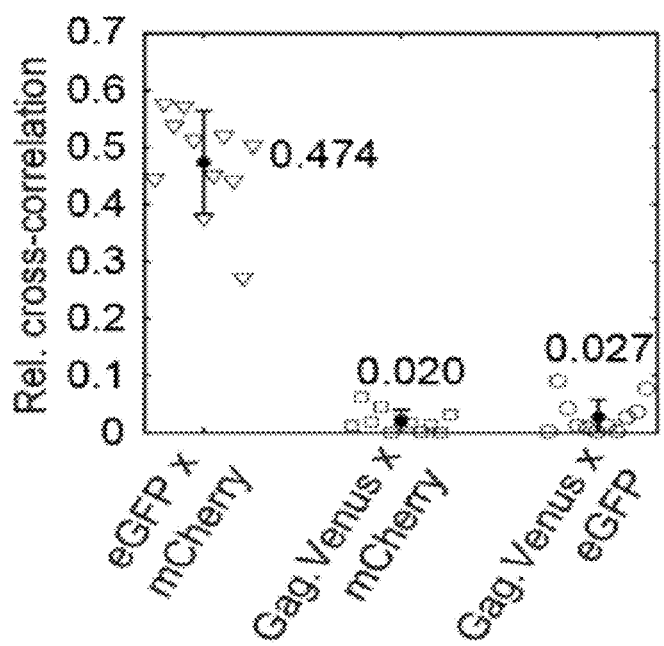
Figure 8:
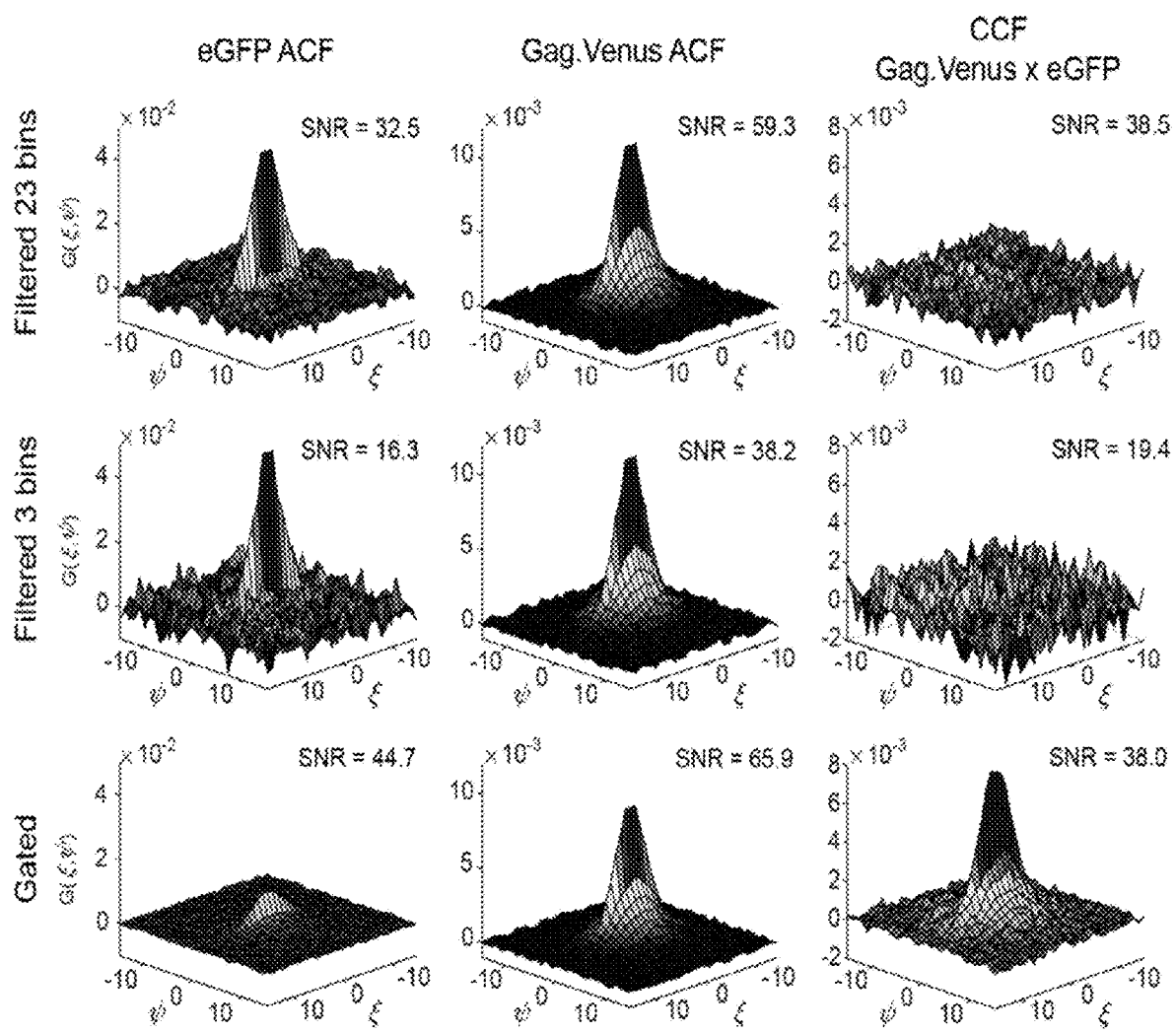
FIG. 8. Three color RSICS experiments in cells with different numbers of spectral bins.
Figure 9:
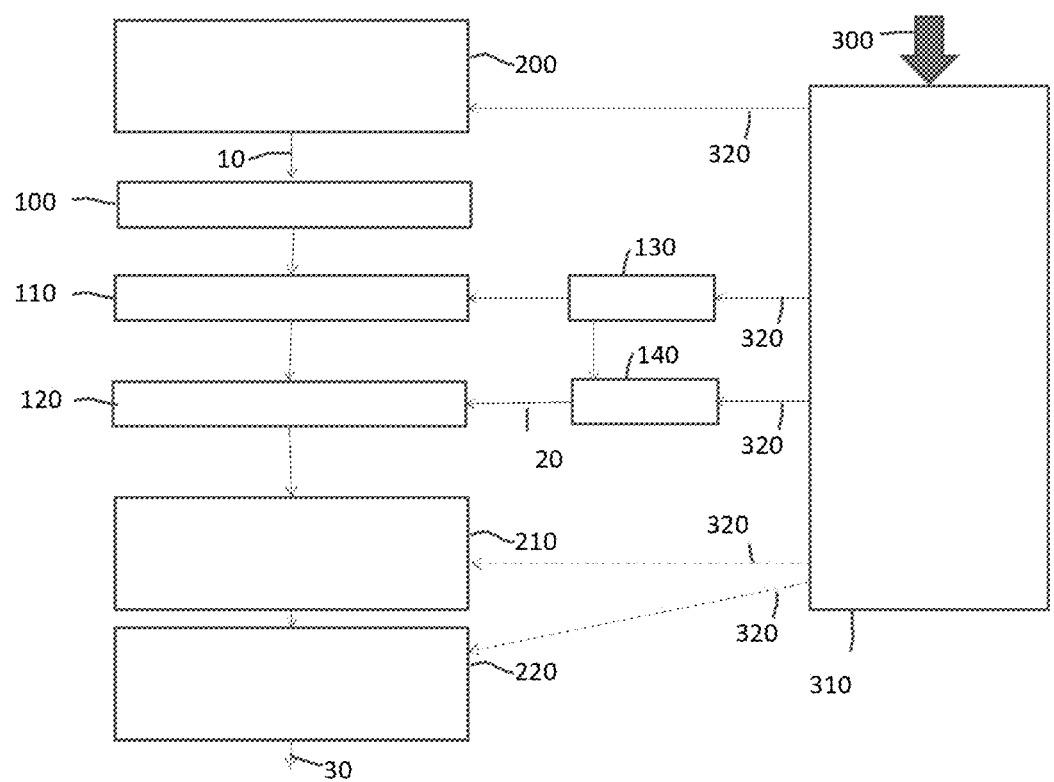
FIG. 9: Schematic overview of the invention

FIGS. 7A-7F. Three-Color RSICS Experiments in Cells. FIG. 7A) An intensity image of a representative HEK 293 cell expressing the eGFP-mCherry tandem and the Gag.Venus proteins. The images show the merged signals (left), as well as the individual channels for mCherry (center left), eGFP (center right) and Gag.Venus (right). Spectral phasor de-mixing was used to separate the intensities for the three channels. The white dotted line highlights the cell nucleus. The scale bars represent 10 μm. FIG. 7B) Recorded spectra (FIG. 7B top) and the corresponding filters (FIG. 7B bottom) for eGFP and mCherry and Gag.Venus. The black line in the spectrum corresponds to a mixture of the three dyes. The dip at 594 nm is caused by the filter set used for the excitation with both 488 nm and 594 nm lasers. FIG. 7C) Exemplary filtered autocorrelation functions of mCherry (left) and eGFP (center) in the tandem eGFP-mCherry protein, and of independently diffusing Gag.Venus (right). FIG. 7D) Exemplary filtered cross-correlation functions between mCherry and eGFP (left), Gag.Venus and mCherry (center), and Gag.Venus and eGFP (right). FIG. 7E) Diffusion coefficient of the eGFP-mCherry tandem extracted from the mCherry channel (squares), the eGFP channel (circles) and the cross-correlation channel (diamonds), as well as the diffusion coefficient for Gag.Venus (triangles). The data are based on cells expressing only the eGFP-mCherry tandem or only Gag.Venus (pure, filled symbols), or both (filtered, empty symbols). The black dots with error bars indicate the average with standard deviation of at least seven measurements. FIG. 7F) Relative filtered cross-correlation between the eGFP and the mCherry channels (triangles), the Gag.Venus and the mCherry channels (squares), as well as the Gag.Venus and the eGFP channels (circles). The black dots with error bars indicate the average with standard deviation of at least ten measurements.

FIG. 8. Three Color RSICS Experiments in Cells with Different Numbers of Spectral Bins.

Autocorrelation function of eGFP (left column), Gag.Venus (center column), and the cross correlation between the two channels (right column) using statistical filtering based on 23 spectral bins (top row), 3 pooled spectral bins (middle row) and gating using 3 pooled spectral bins (bottom row). The SNR was calculated by dividing the correlation amplitude in the center by the standard deviation far away from the center ($\zeta$ and $\psi$ >30). For the cross-correlation the SNR was based on the geometric average of the signal of the autocorrelation functions.

FIGS. 11A-11B and 12A-12B show an exemplary embodiment with two fluorophores with (substantially) overlapping (emission) spectra and the selection of (hardware-based) two (broad-band) channels (as available on commercially available microscopes), wherein part of the boundaries are determined by or at least in the close neighborhood of the crossing of said spectra. The experiment shows that proper selection of those channels enables good correlation results even in the hard circumstances defined here.

REFERENCES

[1] E. L. Elson, D. Magde, Fluorescence correlation spectroscopy. I. Conceptual basis and theory, Biopolym. 13 (1974) 1-27.

[2] D. Magde, E. Elson, W. W. Webb, Thermodynamic fluctuations in a reacting system—measurement by fluorescence correlation spectroscopy, Phys. Rev. Lett. 29 (1972) 705-708.

[3] D. Magde, E. L. Elson, W. W. Webb, Fluorescence correlation spectroscopy. II. An experimental realization, Biopolym. 13 (1974) 29-61.

[4] S. Y. Tetin, Fluorescence Fluctuation Spectroscopy (FFS), Part A, In: A. M. Pyle, D. W. Christianson (Eds.), Methods in Enzymology, 2013, 518, pp. 2-285.

[5] S. Y. Tetin, Fluorescence Fluctuation Spectroscopy (FFS), Part B, In: A. M. Pyle, D. W. Christianson (Eds.), Methods in Enzymology, 2013, 519, pp. 2-325.

[6] S. Ghaemmaghami, W.-K. Huh, K. Bower, R. W. Howson, Global analysis of protein expression in yeast, Nature. 425 (2003) 737-741.

[7] B. D. Slaughter, R. Li, Toward quantitative "in vivo biochemistry" with fluorescence fluctuation spectroscopy, Mol. Biol. Cell. 21 (2010) 4306-4311.

[8] N. O. Petersen, P. L. Höddelius, P. W. Wiseman, O. Seger, K. Magnusson, Quantitation of membrane receptor distributions by image correlation spectroscopy: concept and application, Biophys. J. 65 (1993) 1135-1146.

[9] M. A. Digman, C. M. Brown, P. Sengupta, P. W. Wiseman, A. R. Horwitz, E. Gratton, Measuring fast dynamics in solutions and cells with a laser scanning microscope, Biophys. J. 89 (2005) 1317-1327.

[10] M. A. Digman, P. Sengupta, P. W. Wiseman, C. M. Brown, A. R. Horwitz, E. Gratton, Fluctuation correlation spectroscopy with a laser-scanning microscope: exploiting the hidden time structure, Biophys. J. 88 (2005) L33-L36.

[11] J. Hendrix, W. Schrimpf, M. Höller, D. C. Lamb, Pulsed Interleaved Excitation Fluctuation Imaging, Biophys. J. 105 (2013) 848-861.

[12] J. Hendrix, T. Dekens, W. Schrimpf, D. C. Lamb, Arbitrary-Region Raster Image Correlation Spectroscopy, Biophys. J. 111 (2016) 1-12.

[13] P. Schwille, F.-J. Meyer-Almes, R. Rigler, Dual-color fluorescence cross-correlation spectroscopy for multicomponent diffusional analysis in solution, Biophys. J. 72 (1997) 1878-1886.

[14] M. A. Digman, P. W. Wiseman, A. R. Horwitz, E. Gratton, Detecting protein complexes in living cells from laser scanning confocal image sequences by the cross correlation raster image spectroscopy method, Biophys. J. 96 (2009) 707-716.

[15] K. Bacia, Z. Petrášek, P. Schwille, Correcting for Spectral Cross-Talk in Dual-Color Fluorescence Cross-Correlation Spectroscopy, ChemPhysChem. 13 (2012) 1221-1231.

[16] R. Rigler, Z. Földes-Papp, F.-J. Meyer-Almes, C. Sammet, M. Völcker, A. Schnetz, Fluorescence cross-correlation: a new concept for polymerase chain reaction, J. Biotechnol. 63 (1998) 97-109.

[17] B. Müller, E. Zaychikov, C. Bräuchle, D. C. Lamb, Pulsed Interleaved Excitation, Biophys. J. 89 (2005) 3508-3522.

[18] A. N. Kapanidis, N. K. Lee, T. A. Laurence, S. Doose, E. Margeat, S. Weiss, Fluorescence-aided molecule sorting: analysis of structure and interactions by alternating-laser excitation of single molecules, Proc. Natl. Acad. Sci. USA. 101 (2004) 8936-8941.

[19] Y. Takahashi, J. Nishimura, A. Suzuki, K. Ishibashi, M. Kinjo, A. Miyawaki, Cross-talk-free fluorescence cross-correlation spectroscopy by the switching method, Cell Struct Funct. 33 (2008) 143-150.

[20] M. Böhmer, M. Wahl, H.-J. Rahn, R. Erdmann, J. Enderlein, Time-resolved fluorescence correlation spectroscopy, Chem. Phys. Lett. 353 (2002) 439-445.

[21] W. Becker, H. Hickl, C. Zander, K. Drexhage, M. Sauer, S. Siebert, et al., Time-resolved detection and identification of single analyte molecules in microcapillaries by time-correlated single-photon counting (TCSPC), Rev. Sci. Instrum. 70 (1999) 1835-1841.

[22] A. Benda, P. Kapusta, M. Hof, K. Gaus, Fluorescence spectral correlation spectroscopy (FSCS) for probes with highly overlapping emission spectra, Opt. Express. 22 (2014) 2973-2988.

[23] D. E. Koppel, Statistical accuracy in fluorescence correlation spectroscopy, Phys. Rev. A. 10 (1974) 1938-1945.

[24] H. Qian, On the statistics of fluorescence correlation spectroscopy, Biophys. chem. 38 (1990) 49-57.

[25] S. Saffarian, E. L. Elson, Statistical analysis of fluorescence correlation spectroscopy: the standard deviation and bias, Biophys. J. 84 (2003) 2030-2042.

[26] T. Wohland, R. Rigler, H. Vogel, The standard deviation in fluorescence correlation spectroscopy, Biophys. J. 80 (2001) 2987-2999.

[27] R. C. Weast, CRC handbook of chemistry and physics, 1980: CRC Press, pp. D-270.

[28] J. Hendrix, V. Baungärtel, W. Schrimpf, S. Ivanchenko, M. A. Digman, E. Gratton, et al., Live-cell observation of cytosolic HIV-1 assembly onset reveals RNA-interacting Gag oligomers, J. Cell. Biol. 210 (2015) 629-649.

[29] M. Matsumoto, T. Nishimura, Mersenne twister: a 623-dimensionally equidistributed uniform pseudo-random number generator, ACM T. Model. Comput. S. 8 (1998) 3-30.

[30] Chroma, Chrome® spectra-viewer app. www.chroma.com/spectra-viewer, 2017 (accessed 7 July 2017).

[31] F. Fereidouni, A. N. Bader, N. C. Gerritsen, Spectral phasor analysis allows rapid and reliable unmixing of fluorescence microscopy spectral images, Opt. Express. 20 (2012) 12729-12741.

[32] S. Ivanchenko, D. C. Lamb, Fluorescence correlation spectroscopy: principles and developments, Supramolecular Structure and Function 10, 2011: Springer, Dordrecht, pp. 1-30.

[33] M. Longfils, E. Schuster, N. Loren, A. Särkkä, M. Rudemo, Single particle raster image analysis of diffusion, J. Microsc. 266 (2017) 3-14.

[34] D. C. Lamb, A. Schenk, C. Röcker, C. Scalfi-Happ, G. U. Nienhaus, Sensitivity enhancement in fluorescence correlation spectroscopy of multiple species using time-gated detection, Biophys. J. 79 (2000) 1129-1138.

[35] Y. H. Foo, N. Naredi-Rainer, D. C. Lamb, S. Ahmed, T. Wohland, Factors affecting the quantification of biomolecular interactions by fluorescence cross-correlation spectroscopy, Biophys. J. 102 (2012) 1174-1183.

[36] M. Srivastava, N. O. Petersen, Diffusion of transferrin receptor clusters, Biophys. Chem. 75 (1998) 201-211.

[37] P. W. Wiseman, C. M. Brown, D. J. Webb, B. Hebert, N. L. Johnson, J. A. Squier, et al., Spatial mapping of integrin interactions and dynamics during cell migration by image correlation microscopy, J. Cell. Sci. 117 (2004) 5521-5534.

[38] M. Drobizhev, S. Tillo, N. Makarov, T. Hughes, A. Rebane, Absolute two-photon absorption spectra and two-photon brightness of orange and red fluorescent proteins, J. Phys. Chem. B. 113 (2009) 855-859.

[39] M. J. Previte, S. Pelet, K. H. Kim, C. Buehler, P. T. So, Spectrally resolved fluorescence correlation spectroscopy based on global analysis, Anal. Chem. 80 (2008) 3277-3284.

[40] T. Niehörster, A. Löschberger, I. Gregor, B. Krämer, H.-J. Rahn, M. Patting, et al., Multi-target spectrally resolved fluorescence lifetime imaging microscopy, Nat. Methods. 13 (2016) 257-262.

The invention claimed is:

1. A method for improving fluorescence data obtained with a fluorescence fluctuation microscope, the method comprising:
   loading the fluorescence data, related to a plurality of individual dyes;
   filtering the fluorescence data in a predetermined amount of specially selected created channels to obtain filtered data, the predetermined amount of specially selected created channels being determined by a number of fluorophores present in the individual dyes, the created channels being spectrally non-overlapping and selected to contain the majority of photons of corresponding fluorophores while limiting contribution from other individual dyes;
   determining optimal spectral filters for applying spectral filtering on the filtered data to separate the data into signals by analyzing a crosstalk-free correlation of the individual dyes; and
   applying a spectral filtering on the filtered data with the optimal spectral filters to separate the data into separated signals, each separated signal being related to a corresponding individual dye, to thereby determine fluctuation signatures present in the data.

2. The method of claim 1, wherein the fluorescence data obtained with the fluorescence fluctuation microscope is not spectrally filtered.

3. The method of claim 1, wherein the fluorescence data obtained with the fluorescence fluctuation microscope is acquired from multiple different fluorophores simultaneously.

4. The method of claim 1, wherein filtering the data comprises band-pass filtering the data.

5. The method of claim 1, wherein the specially selected created channels are specially selected artificially created channels.

6. The method of claim 1, further comprising applying a correlation analysis on the separated signals.

7. The method of claim 6, further comprising optimizing in view of the application of the correlation analysis at least one of the loading of the fluorescence data, the filtering the data, and the applying the spectral filtering.

8. The method of claim 6, wherein the correlation analysis is a statistically weighted data correlation.

9. The method of claim 1, wherein the fluorescence data is obtained from a mixture of particles comprising the plurality of dyes, the method further comprising:
   determining a characteristic of the mixture of particles from the separated signals, the characteristic being chosen from a concentration, a mobility, an interaction, and a stoichiometry.

10. The method of claim 9, further comprising optimizing the loading of the fluorescence data, the filtering the data, or the applying the spectral filtering, in view of a correlation analysis.

11. The method of claim 1, further comprising determining parameters of an entire measurement set-up and test scenario by:
    loading given conditions; and
    determining the parameters from the given conditions in a format for providing the parameters to at least one of the loading of the fluorescence data, the filtering the data, and the applying the spectral filtering.

12. The method of claim 1, further comprising selecting the predetermined amount of specially selected created channels by:
    loading given conditions; and
    selecting the specially selected created channels to contain the majority of photons of one corresponding fluorophore while limiting the contribution from the other dyes.

13. The method of claim 1, further comprising selecting optimal determining spectral filters by:
    loading given conditions;
    loading the specially selected created channels to contain the majority of photons of one corresponding fluorophore while limiting the contribution from the other dyes; and
    analyzing a crosstalk-free correlation of species to select the optimal determining spectral filters.

14. A non-transitory computer-readable medium for storing computer-executable instructions that are executed by a processor to perform the operations of the method according to claim 1.

15. A system for processing fluorescence data obtained by a microscope, the system comprising:
    (a) a computer including a processor and a memory; and
    (b) a microscope, connected to the computer, the computer being provided with computer-executable instructions to execute the operations of the method according to claim 1.

* * * * *

UNITED STATES PATENT AND TRADEMARK OFFICE
CERTIFICATE OF CORRECTION

PATENT NO. : 11,422,094 B2
APPLICATION NO. : 16/960453
DATED : August 23, 2022
INVENTOR(S) : Jelle Hendrix et al.

It is certified that error appears in the above-identified patent and that said Letters Patent is hereby corrected as shown below:

In the Specification

In Column 5, Line(s) 61, delete "RIGS" and insert --RICS--, therefor.
In Column 6, Line(s) 12, delete "RIGS" and insert --RICS--, therefor.
In Column 6, Line(s) 18, delete "RIGS" and insert --RICS--, therefor.
In Column 6, Line(s) 24, delete "RIGS" and insert --RICS--, therefor.
In Column 13, Line(s) 12, delete "FIG" and insert --FIGS.--, therefor.
In Column 13, Line(s) 13, delete "2C-D" and insert --2C-2D--, therefor.
In Column 15, Line(s) 11, delete "RIGS" and insert --RICS--, therefor.
In Column 15, Line(s) 48, delete "RIGS" and insert --RICS--, therefor.
In Column 16, Line(s) 55, delete "RIGS" and insert --RICS--, therefor.
In Column 16, Line(s) 67, delete "RIGS" and insert --RICS--, therefor.
In Column 17, Line(s) 48, delete "RIGS" and insert --RICS--, therefor.
In Column 18, Line(s) 21, delete "RIGS" and insert --RICS--, therefor.
In Column 19, Line(s) 61, before "dotted", delete "blue".
In Column 22, Line(s) 38, delete "N. C. Gerritsen" and insert --H. C. Gerritsen--, therefor.

Signed and Sealed this
Twentieth Day of December, 2022

Katherine Kelly Vidal
*Director of the United States Patent and Trademark Office*